(12) United States Patent
Heo et al.

(10) Patent No.: US 11,843,818 B2
(45) Date of Patent: Dec. 12, 2023

(54) ELECTRONIC DEVICE AND MULTIMEDIA PLAYBACK METHOD THEREOF

(71) Applicant: SAMSUNG ELECTRONICS CO., LTD., Suwon-si (KR)

(72) Inventors: Jin Heo, Suwon-si (KR); Keunha Choi, Suwon-si (KR); Wonki Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/838,850

(22) Filed: Jun. 13, 2022

(65) Prior Publication Data
US 2023/0038192 A1 Feb. 9, 2023

Related U.S. Application Data

(63) Continuation of application No. PCT/KR2022/007627, filed on May 30, 2022.

(30) Foreign Application Priority Data

Aug. 5, 2021 (KR) .................. 10-2021-0103452

(51) Int. Cl.
 *H04N 21/43* (2011.01)
 *H04N 21/442* (2011.01)
 (Continued)

(52) U.S. Cl.
 CPC ......... *H04N 21/4302* (2013.01); *H04L 65/70* (2022.05); *H04N 21/234* (2013.01); *H04N 21/2335* (2013.01); *H04N 21/44209* (2013.01)

(58) Field of Classification Search
 CPC ........... H04N 21/4302; H04N 21/2335; H04N 21/234; H04N 21/44209; H04L 65/70
 See application file for complete search history.

(56) References Cited

U.S. PATENT DOCUMENTS

| 6,339,760 B1 | 1/2002 | Koda et al. |
| 7,274,862 B2 * | 9/2007 | Komori .................. G11B 27/10 386/207 |

(Continued)

FOREIGN PATENT DOCUMENTS

| JP | 2019-176503 | 10/2019 |
| KR | 10-0609173 | 8/2006 |

(Continued)

OTHER PUBLICATIONS

Search Report and Written Opinion dated Sep. 1, 2022 in corresponding International Patent Application No. PCT/ KR2022/007627.

*Primary Examiner* — Mulugeta Mengesha
(74) *Attorney, Agent, or Firm* — Nixon & Vanderhye, P.C.

(57) ABSTRACT

An example electronic device according to various embodiments of this document may include: at least one auxiliary processor; and a main processor operably connected to the at least one auxiliary processor, wherein the main processor may be configured to: obtain moving image data; separate the moving image data into image data including plural consecutive image frames, first audio data including plural consecutive audio frames, and plural timestamps corresponding respectively to the plural consecutive audio frames; generate second audio data using the first audio data by adding header data to each of the plural audio frames; transmit the second audio data to the at least one auxiliary processor; generate, based on first time information successively received from the at least one auxiliary processor, second time information; and play back the image data based on the second time information, and wherein the at least one auxiliary processor may be configured to: play back an audio signal based on the received second audio (Continued)

data; and generate the first time information about a playback time of the audio signal based on the header data.

16 Claims, 12 Drawing Sheets

(51) Int. Cl.
*H04L 65/70* (2022.01)
*H04N 21/234* (2011.01)
*H04N 21/233* (2011.01)

(56) References Cited

U.S. PATENT DOCUMENTS

| | | | |
|---|---|---|---|
| 8,605,599 B2 | 12/2013 | Yoo | |
| 9,083,994 B2 | 7/2015 | Cheng et al. | |
| 9,888,047 B2 | 2/2018 | Friedrich et al. | |
| 10,484,734 B2 | 11/2019 | Toma et al. | |
| 10,674,228 B2 | 6/2020 | Schreiner et al. | |
| 11,190,806 B2 | 11/2021 | Lee et al. | |
| 11,463,779 B2 | 10/2022 | Hu et al. | |
| 2012/0207225 A1 | 8/2012 | Jeong | |
| 2013/0177290 A1 | 7/2013 | Chung et al. | |
| 2016/0100211 A1* | 4/2016 | Toma | H04N 21/2368 |
| | | | 725/116 |
| 2018/0310047 A1* | 10/2018 | Duan | H04N 21/44008 |
| 2020/0314460 A1* | 10/2020 | Hu | H04N 21/2368 |
| 2021/0021889 A1* | 1/2021 | Yu | H04N 21/4307 |
| 2021/0076071 A1* | 3/2021 | Lee | H04N 19/68 |

FOREIGN PATENT DOCUMENTS

| | | |
|---|---|---|
| KR | 10-2006-0134747 | 12/2006 |
| KR | 10-2017-0023870 | 3/2017 |
| KR | 10-1729765 | 5/2017 |
| KR | 10-1832963 | 2/2018 |
| KR | 10-1849749 | 5/2018 |
| KR | 10-2021-0028880 | 3/2021 |

\* cited by examiner

ELECTRONIC DEVICE AND MULTIMEDIA PLAYBACK METHOD THEREOF

CROSS-REFERENCE TO RELATED APPLICATIONS

This application is a continuation of International Application No. PCT/KR2022/007627 designating the United States, filed on May 30, 2022, in the Korean Intellectual Property Receiving Office and claiming priority to Korean Patent Application No. 10-2021-0103452, filed on Aug. 5, 2021, in the Korean Intellectual Property Office, the disclosures of which are incorporated by reference herein in their entireties.

BACKGROUND

Field

The disclosure relates to an electronic device, for example, to a method for maintaining synchronization between image data and audio data included in moving image data reproduced by the electronic device.

Description of Related Art

With advancements in mobile communication and hardware/software technology, portable electronic devices (hereinafter, electronic devices) such as smartphones provide various functions. Electronic devices can play back multimedia content such as moving images including images and audio.

Multimedia content may be stored, transmitted, and/or reproduced in the form of data included in various media containers. Multimedia content can be provided by including data of various formats in one media container. The types of data included in a media container may include some of, for example, metadata, image (video) data, audio data, and text data.

The electronic device may separate encoded data in the same media container according to types (e.g., image data and audio data), and may decode and reproduce separated data of different types using different components (e.g., main processor and auxiliary processor) (hereinafter, offloaded playback method). In this case, as different types of data can be simultaneously processed by different components, the processing time required for multimedia playback can be reduced. However, when data included in the same media container is played back using the offloaded playback method, because processing is performed by different components, maintaining synchronization between the types of data can become more difficult.

SUMMARY

An electronic device according to various embodiments of this document may include: at least one auxiliary processor; and a main processor operably connected to the at least one auxiliary processor, wherein the main processor may be configured to: obtain moving image data; separate the moving image data into image data including plural consecutive image frames, first audio data including plural consecutive audio frames, and plural timestamps corresponding respectively to the plural consecutive audio frames; generate second audio data using the first audio data by adding header data to each of the plural audio frames; transmit the second audio data to the at least one auxiliary processor; generate, based on first time information successively received from the at least one auxiliary processor, second time information; and play back the image data based on the second time information, and wherein the at least one auxiliary processor may be configured to: play back an audio signal based on the received second audio data; and generate the first time information about a playback time of the audio signal based on the header data.

A method for an electronic device including at least one auxiliary processor to play back moving image data according to various embodiments of this document may include: separating the moving image data into image data including plural consecutive image frames, first audio data including plural consecutive audio frames, and plural timestamps corresponding respectively to the plural consecutive audio frames; generating second audio data using the first audio data by adding header data to each of the plural audio frames; transmitting the second audio data to the at least one auxiliary processor; generating, based on first time information successively received from the at least one auxiliary processor, second time information; and playing back the image data based on the second time information.

An electronic device according to various embodiments disclosed in this document may include: a communication module communicatively connected to an external electronic device; and a processor operably connected to the communication module, wherein, based on playing back moving image data, the processor is configured to: separate the moving image data into image data including plural consecutive image frames and first audio data including plural consecutive audio frames; identify, based on the first audio data including audio frames encoded in AAC, whether the external electronic device supports ADTS-formatted data; generate second audio data by adding header data to each of the plural audio frames based on identifying that the external electronic device supports ADTS-formatted data; transmit the second audio data to the external electronic device; generate, based on first time information received from the external electronic device, second time information; and play back the image data based on the second time information.

According to various embodiments, when multimedia is played back using the offloaded playback method, synchronization between images and audio can be maintained.

According to various embodiments, by using the offloaded playback method, it is possible to reduce current consumption and reduce the time and current consumed for processing multimedia data.

According to various embodiments, it can be ensured during video playback that the synchronization quality can be maintained when an audio frame encoded in AAC is played back by the offloaded playback method.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
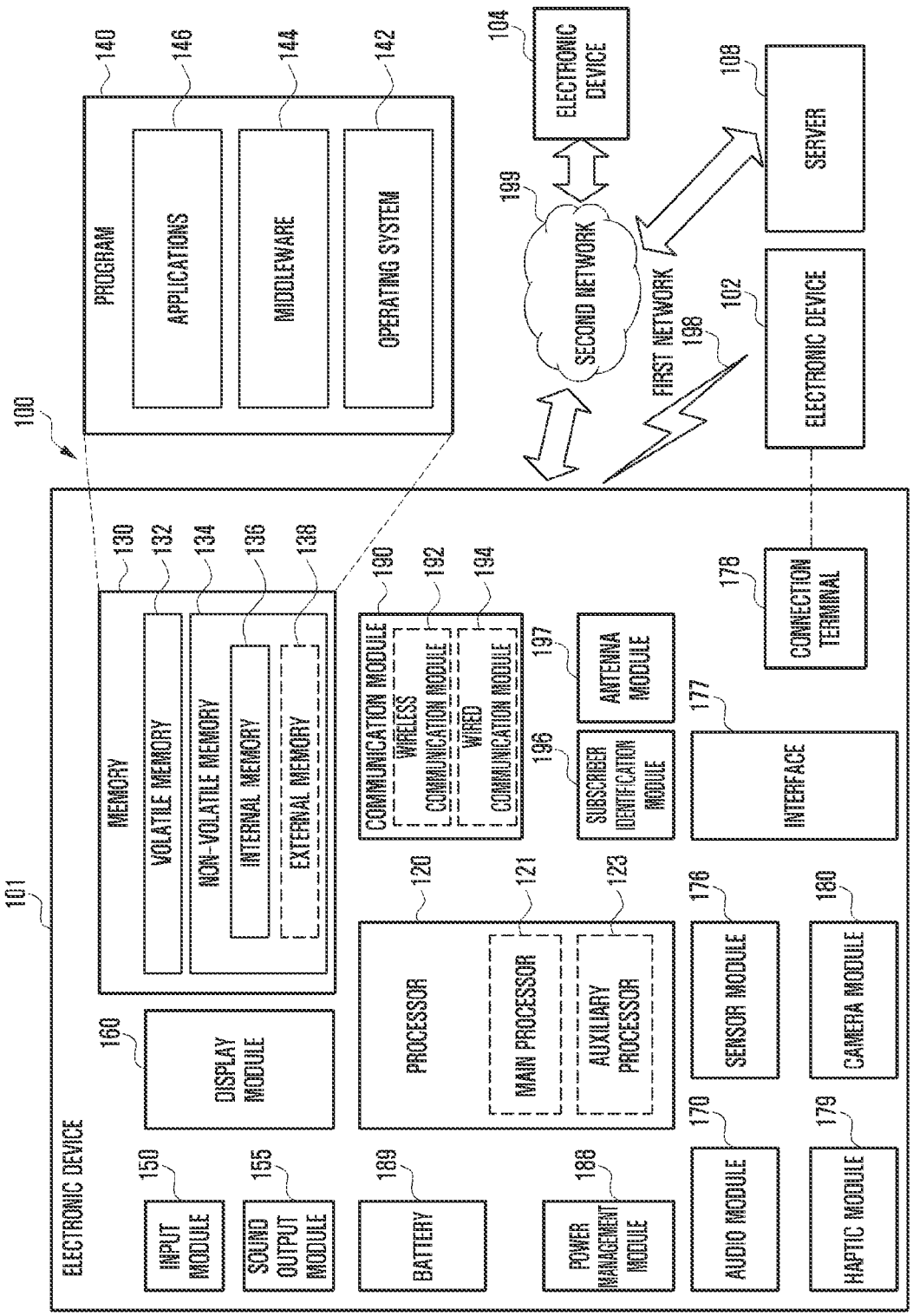
FIG. 1 is a block diagram of an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
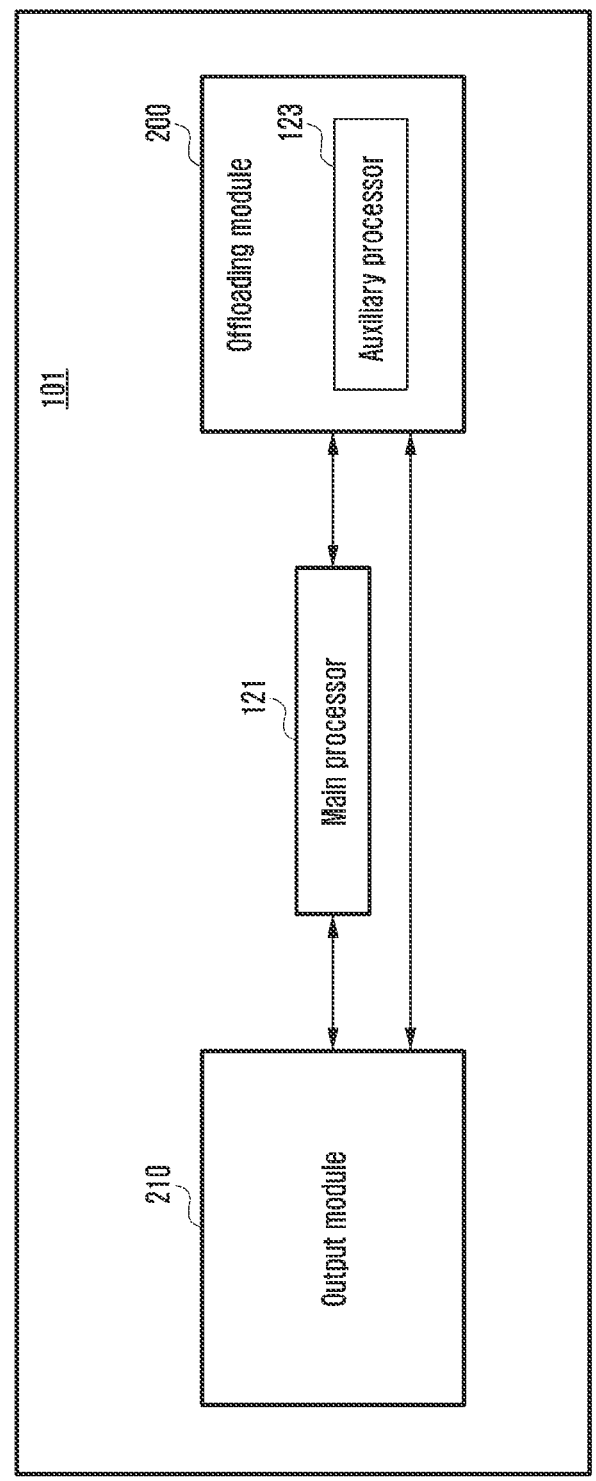
FIG. 2 is a block diagram of an example electronic device according to various embodiments.

FIG. 2 is a block diagram of an example electronic device according to various embodiments.

With reference to FIG. 2, the electronic device 101 may include a main processor 121, an offloading module 200, and an output module 210. In certain embodiments, some of the components illustrated in FIG. 2 may be omitted or replaced. The electronic device 101 may further include at least some of the configurations and/or functions of the electronic device 101 in FIG. 1. At least some of the illustrated (or not illustrated) components in the electronic device 101 may be connected operably, functionally, and/or electrically.

According to various embodiments, the output module 210 may include output circuitry and output multimedia content to the outside of the electronic device 101. The multimedia content may include, for example, an acoustic signal and a visual signal. As another example, the output module 210 may output an image to the outside. According to an embodiment, the output module 210 may include at least some of the configurations and/or functions of the sound output module 155, the display module 160, and the audio module 170 in FIG. 1.

According to various embodiments, the offloading module 200 may include various circuitry for playing back multimedia data received from the main processor 121. According to various embodiments, the offloading module 200 may receive audio data from the main processor 121 and process the received audio data. The audio data received by the offloading module 200 may be encoded data. According to an embodiment, the offloading module 200 may decode the received audio data. According to an embodiment, the offloading module 200 may output a sound signal based on the decoded audio data through the output module 210 to the outside. According to an embodiment, the offloading module 200 may include an auxiliary processor 123. The auxiliary processor 123 may include, for example, a digital signal processor (DSP). According to an embodiment, the offloading module 200 may transmit or receive data related to reproduction of audio data to or from the main processor 121. For example, the auxiliary processor 200 may generate data regarding the audio playback time (e.g., first time information) and receive a request for first time information from the main processor 121. Upon receiving a request for first time information from the main processor 121, the auxiliary processor 200 may transmit the first time information to the main processor 121.

According to various embodiments, the main processor 121 is a component capable of performing operations or data processing related to control and/or communication of individual components of the electronic device 101, and may include one or more processors. The main processor 121 may include at least some of the constitutions and/or functions of the processor 120 in FIG. 1.

According to various embodiments, although there are no limitations to computational and data processing functions that the main processor 121 can carry out on the electronic device 101, hereinafter a description is provided of various embodiments related to audio data playback using an offloaded playback method based on the offloading module 200 when the electronic device 101 plays back moving image data. Hereinafter, contents related to the reproduction of moving image data by the electronic device 101 among multimedia data will be described, but various embodiments may be applied to various types of multimedia data in addition to moving image data.

According to various embodiments, the main processor 121 may obtain moving image data. The moving image data may include one or more pieces of image data and audio data. According to an embodiment, the main processor 121 may receive streaming data from an external electronic device (e.g., electronic device 102 or 104, or server 108 in FIG. 1), and obtain moving image data included in the received streaming data. According to an embodiment, the main processor 121 may obtain moving image data by reading data stored in the memory (e.g., memory 130 in FIG. 1).

According to various embodiments, the main processor 121 may obtain image data and first audio data. According to an embodiment, the main processor 121 may de-multiplex the obtained moving image data to separate image data, audio data (e.g., first audio data), and a timestamp corresponding to the audio data. According to an embodiment, the image data and audio data (e.g., first audio data) obtained through de-multiplexing by the main processor 121 may each be encoded data. According to an embodiment, the image data may include a plurality of encoded image frames. The plural image frames may include consecutive images. According to an embodiment, the first audio data may include a plurality of encoded audio frames. The plural audio frames may include a continuous sound signal. According to an embodiment, the first audio data may include a plurality of consecutive audio frames encoded in advanced audio coding (AAC) format. The timestamp may include multiple pieces of data corresponding respectively to plural frames included in the audio data, and may be data including time information corresponding to each audio frame.

According to various embodiments, the main processor 121 may generate second audio data and transmit the generated second audio data to the offloading module 200. According to an embodiment, the main processor 121 may not transmit a timestamp to the offloading module 200. The main processor 121 may generate the second audio data based on the first audio data obtained from moving image data. The second audio data may be obtained by adding header data to the first audio data. The header data may include metadata corresponding to the first audio data. According to an embodiment, the main processor 121 may generate a plurality of header data corresponding respectively to plural audio frames included in the first audio data. The plural header data may include metadata for each of the plural audio frames, for example, information on the length and sampling frequency of the audio frame. According to an embodiment, the header data may include data in audio data transport stream (ADTS) format. When the first audio data includes audio frames encoded in AAC, the main processor 121 may generate header data in ADTS format. According to an embodiment, the main processor 121 may generate the second audio data by adding the generated header data to the first audio data. According to an embodiment, the main processor 121 may identify whether the image data is played back simultaneously with the audio signal. Upon identifying that the image data is played back simultaneously with the audio signal, the main processor 121 may generate the second audio data by adding header data.

According to an embodiment, the main processor 121 may identify whether the first audio data is data encoded in AAC. The main processor 121 may read encoding information of the obtained first audio data and identify whether an audio frame encoded in AAC is included. For example, the main processor 121 may identify whether the first audio data includes audio frames encoded in AAC based on information obtained by parsing header information.

According to an embodiment, the main processor 121 may identify whether the offloading module 200 supports data in ADTS format. For example, the main processor 121 may identify whether the offloading module 200 can read, decode, and reproduce ADTS-formatted data based on an audio playback related signal received from the offloading module 200. As another example, the main processor 121 may identify whether the offloading module 200 supports ADTS-formatted data based on information pre-stored in the memory (e.g., memory 130 in FIG. 1).

According to various embodiments, the main processor 121 may receive first time information from the offloading module 200. The first time information may be time information generated by the offloading module 200 through decoding plural audio frames included in the second audio data. The first time information may be, for example, time information for the offloading module 200 to play back individual audio frames. According to an embodiment, the first time information may be time information generated by the offloading module 200 based on header data. For example, the offloading module 200 may generate the first time information based on information about the audio frame length included in the header data.

According to various embodiments, the main processor 121 may play back image data based on the first time. According to an embodiment, the main processor 121 may decode plural image frames included in the image data and output them to the outside by using a display module (e.g., display module 160 in FIG. 1). According to an embodiment, the main processor 121 may play back image data based on the first time information so as to play back the plural image frames at the same time with the audio frames corresponding thereto in synchronization. According to an embodiment, the main processor 121 may generate second time information based on the first time information, and play back image data based on the generated second time information. The second time information may include, for example, time information obtained by adding the first time information to a preset reference time. The reference time may be a preset and stored value, and the main processor 121 may change the reference time.

According to various embodiments, the main processor 121 may identify whether a time jump has occurred. A time jump may be understood as an event in which the interval between timestamps corresponding respectively to plural audio frames is not constant. According to an embodiment, the first audio data may include plural consecutive audio frames, and the timestamp may include a plurality of data corresponding respectively to the plural audio frames. The timestamp may include time information corresponding to each audio frame. According to an embodiment, the main processor 121 may identify whether a time jump has occurred by comparing a difference between timestamps (e.g., first timestamp and second timestamp) corresponding to consecutive audio frames (e.g., first audio frame and second audio frame) with a time jump threshold. According to an embodiment, the time jump threshold may be calculated based on the audio frame length and the frame sampling frequency value. For example, the value obtained by dividing the audio frame length by the sampling frequency may be equal to a constant difference value of consecutive timestamps within a margin of error. According to an embodiment, when the audio frame length is not constant, the main processor 121 may set a predetermined value as the time jump threshold. According to an embodiment, the main processor 121 may determine that a time jump has occurred if a difference value between two consecutive timestamps is greater than the time jump threshold. Although the length of the audio frame, the sampling frequency of the audio frame, and the time jump threshold corresponding thereto may have various values, the description herein is based on an assumption that the sample size is 1024 bytes, the sampling frequency is 44100 Hz, that is, the time jump threshold is 0.023 seconds (23 ms). As noted, these values are provided by way of example, not limitation.

According to various embodiments, the main processor 121 may stop transmitting audio frames to the offloading module 200 when a time jump has occurred. For example, when a time jump is identified between two consecutive audio frames, that is, between a first audio frame and a second audio frame, the main processor 121 may transmit up to the first audio frame to the offloading module 200 and then stop transmission of the second audio frame. This may be a case in which the difference value between the first timestamp and the second timestamp exceeds the time jump threshold, and the second audio frame corresponding to the second timestamp may be referred to as "audio frame in which a time jump has occurred".

According to various embodiments, the main processor 121 may receive playback completion information from the offloading module 200. According to an embodiment, when all audio frames received from the main processor 121 are decoded, the offloading module 200 may generate playback completion information and transmit the playback completion information to the main processor 121. According to an embodiment, after stopping transmission of the second audio frame, the main processor 121 may transmit a signal for stopping audio playback to the offloading module 200. The playback completion information may be a signal generated by the offloading module 200 in response to the signal for stopping audio playback.

According to various embodiments, the main processor 121 may change the reference time. According to an embodiment, the main processor 121 may change the reference time based on a timestamp value (e.g., second timestamp) corresponding to the audio frame in which a time jump has occurred. The reference time may have an initial value set to 0, or may have a value already changed from the initial value. According to an embodiment, the main processor 121 may change the reference time based on the second timestamp value. For example, the main processor 121 may change the reference time by adding a second timestamp value at which a time jump has occurred to the reference time.

According to various embodiments, the main processor 121 may resume audio frame transmission. The main processor 121 having changed the reference time may transmit audio frames again to the offloading module 200. According to an embodiment, the main processor 121 may generate second time information by adding the first time information, which is generated and transmitted by the offloading module 200 based on received audio frames, to the changed reference time. The main processor 121 may play back image data based on the generated second time information.

Figure 3:
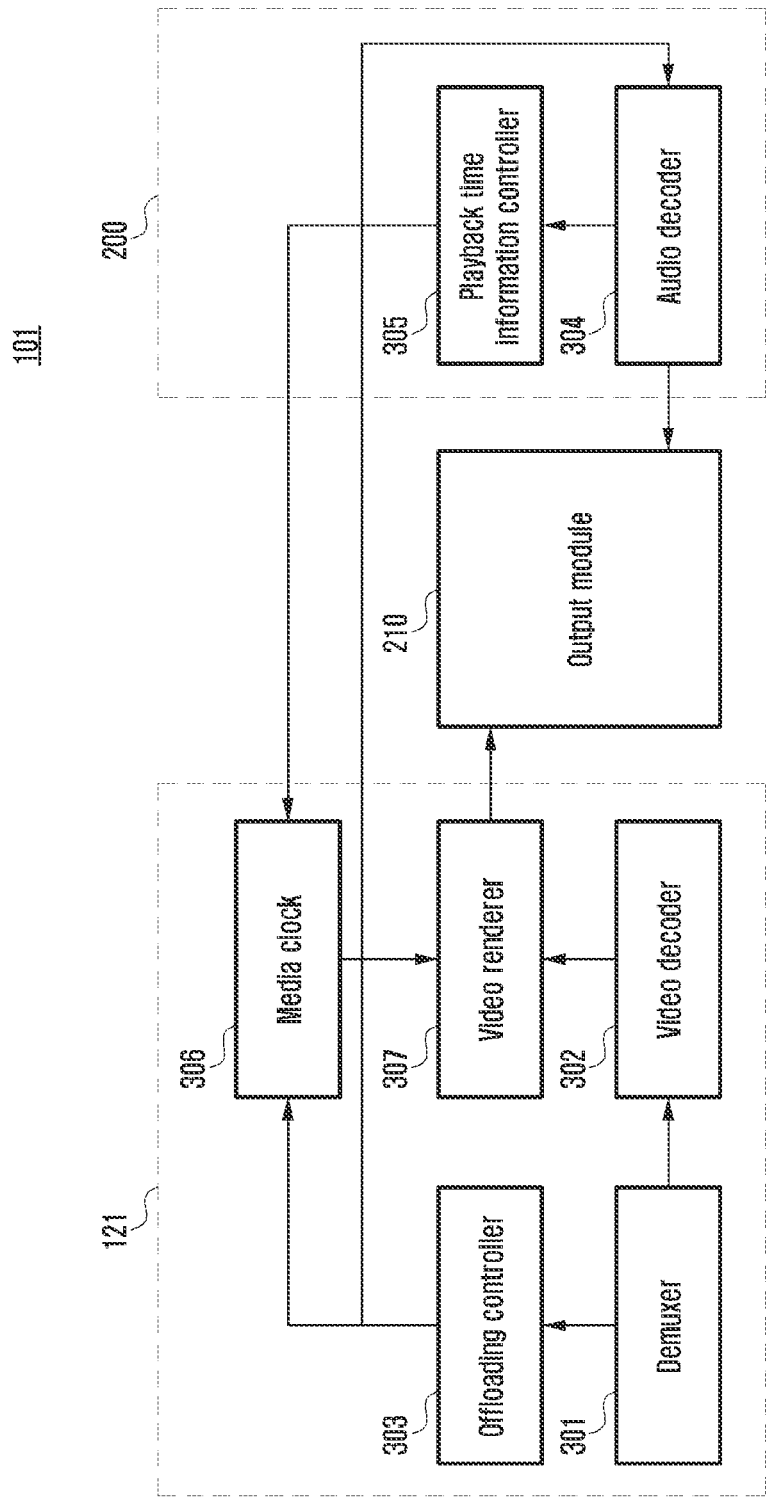
FIG. 3 is a block diagram of example components used to reproduce moving image data according to various embodiments.

FIG. 3 is a block diagram of example components used to reproduce moving image data according to various embodiments.

According to various embodiments, the demuxer 301 (de-multiplexer) may de-multiplex moving image data obtained by the main processor 121 to separate audio data, image data, and timestamps corresponding to the audio data. According to an embodiment, the moving image data may include both audio data and image data, and these data may be multiplexed and transmitted to the demuxer 301. The demuxer 301 may transmit the image data and the audio data obtained as a result of demultiplexing to the video decoder 302 and the offloading controller 303, respectively.

According to various embodiments, the offloading controller 303 may transform the received audio data. According to an embodiment, the audio data (e.g., first audio data) received by the offloading controller 303 from the demuxer 301 may include a plurality of audio frames. According to an embodiment, the offloading controller 303 may generate second audio data including a plurality of header data and audio frames by adding a plurality of header data corresponding respectively to the audio frames included in the first audio data. According to an embodiment, the offloading controller 303 may identify whether image data is played back simultaneously with the audio signal. Upon identifying that the image data is played back simultaneously with the audio signal, the offloading controller 303 may generate the second audio data by adding header data.

According to various embodiments, the offloading controller 303 may generate second audio data and transmit the generated second audio data to the audio decoder 304. The offloading controller 303 may generate the second audio data based on the first audio data received from the demuxer 301. The second audio data may be a result of adding header data to the first audio data. The header data may include metadata corresponding to the first audio data. According to an embodiment, the offloading controller 303 may generate a plurality of header data corresponding respectively to plural audio frames included in the first audio data. The plurality of header data may include metadata for each of the plural audio frames, for example, information on the length and sampling frequency of the audio frame. According to an embodiment, the header data may include data in audio data transport stream (ADTS) format. When the first audio data includes audio frames encoded in AAC, the offloading controller 303 may generate ADTS-formatted header data. According to an embodiment, the offloading controller 303 may generate the second audio data by adding the generated header data to the first audio data.

According to an embodiment, the offloading controller 303 may identify whether the first audio data is data encoded in AAC. For example, the offloading controller 303 may read encoding information of the obtained first audio data to identify whether audio frames encoded in AAC are included. For example, the offloading controller 303 may identify whether the first audio data includes audio frames encoded in AAC using information obtained by parsing header information at the demuxer 301.

According to an embodiment, the offloading controller 303 may identify whether the audio decoder 304 supports ADTS-formatted data. For example, the offloading controller 303 may identify whether the audio decoder 304 can read, decode, and reproduce ADTS-formatted data based on an audio playback related signal received from the audio decoder 304. As another example, the offloading controller 303 may identify whether the audio decoder 304 supports ADTS-formatted data based on information pre-stored in the memory (e.g., memory 130 in FIG. 1).

According to various embodiments, the offloading controller 303 may transmit information regarding whether a time jump event has occurred to the media clock 306. According to an embodiment, the offloading controller 303 may receive plural timestamps corresponding respectively to individual audio frames from the demuxer 301. According to various embodiments, the offloading controller 303 may identify whether a time jump has occurred. A time jump may be understood as an event in which the interval between timestamps corresponding respectively to individual audio frames is not constant. The timestamp may include time information corresponding to each audio frame. According to an embodiment, the offloading controller 303 may identify whether a time jump has occurred by comparing a difference between timestamps (e.g., first timestamp and second timestamp) corresponding to consecutive audio frames (e.g., first audio frame and second audio frame) with a time jump threshold. According to an embodiment, the time jump threshold may be calculated based on the audio frame length and the frame sampling frequency value. For example, the value obtained by dividing the audio frame length by the sampling frequency may be equal to a constant difference value of consecutive timestamps within a margin of error. According to an embodiment, when the audio frame length is not constant, the offloading controller 303 may set a predetermined value as the time jump threshold. According to an embodiment, the offloading controller 303 may determine that a time jump has occurred if a difference value between two consecutive timestamps is greater than the time jump threshold. According to an embodiment, when a time jump has occurred, the offloading controller 303 may stop transmitting the second audio data to the audio decoder 304. When a time jump has occurred, the offloading controller 303 may transmit information regarding whether a time jump has occurred to the media clock 306. After the media clock 306 changes the reference time based on the occurrence of the time jump, the offloading controller 303 may resume audio frame transmission to the audio decoder 304.

According to various embodiments, the audio decoder 304 may decode the second audio data received from the offloading controller 303. According to an embodiment, the audio data received by the audio decoder 304 from the offloading controller 303 may include a plurality of audio frames, and each audio frame may be data encoded in a preset manner. According to an embodiment, the audio decoder 304 may convert a plurality of encoded audio frames into a plurality of decoded audio frames by performing decoding based on the encoding method of the encoded audio frames. The audio decoder 304 may transfer the decoded audio frames to the output module 210.

According to various embodiments, the playback time information controller 305 may update playback time information based on header data included in the second audio data. The header data may include information about the length of plural audio frames, and it is possible to calculate the audio playback time according to the sampling frequency when each audio frame is played back through the output module 210. According to an embodiment, the playback time information controller 305 may generate first time information related to audio reproduction in response to playback of each audio frame. The playback time information controller 305 may periodically and/or continuously update the first time information for the media clock 306.

According to various embodiments, the media clock 306 may generate and change time information (e.g., second time information) related to image data playback for moving image reproduction. According to an embodiment, the second time information may be time information referenced to reproduce a plurality of image frames. The media clock 306 may transfer the second time information to the video renderer 307. According to an embodiment, the second time information may have a value obtained by adding the first time information to the reference time. The first time information may be time information received from the playback time information controller 305. The first time information may be time information related to audio data reproduction. According to an embodiment, the playback time information controller 305 may transmit the first time information generated during playback of plural audio frames, and the media clock 306 may periodically and/or continuously receive the first time information from the playback time information controller 305.

According to various embodiments, the media clock 306 may change the reference time. According to an embodiment, the media clock 306 may change the reference time based on a timestamp value (e.g., second timestamp) corresponding to the audio frame in which a time jump has occurred. The reference time may have an initial value set to 0, or may have a value already changed from the initial value. According to an embodiment, the media clock 306 may change the reference time based on the second timestamp value. For example, the media clock 306 may change the reference time by adding a second timestamp value at which a time jump has occurred to the reference time. According to an embodiment, the media clock 306 may generate second time information by adding the first time to the changed reference time.

According to various embodiments, the video decoder 302 may receive image data from the demuxer 301. According to an embodiment, the image data received by the video decoder 302 from the demuxer 301 may include a plurality of image frames, and each image frame may be data encoded in a preset manner. According to an embodiment, the video decoder 302 may convert a plurality of encoded video frames into a plurality of decoded video frames by performing decoding based on the encoding method of the encoded video frames. The video decoder 302 may transfer the decoded image frames to the video renderer 307.

According to various embodiments, the video renderer 307 may perform a rendering operation of image data to be processed on the output module 210. The video renderer 307 generates an image to be output frame by frame based on the decoded image frame received from the video decoder 302, and transmits a command to display the generated image to the output module 210. The video renderer 307 may receive information related to an image output time (e.g., second time information) from the media clock 306. The video renderer 307 may output an image frame based on the received second time information.

According to various embodiments, the output module 210 may output multimedia content to the outside of the electronic device 101. The output module 210 may output an image frame received from the video renderer 307 based on the second time to the outside by using a display module (e.g., display module 160 in FIG. 1). The output module 210 may output an audio frame received from the audio decoder 304 to the outside by using a sound output module (e.g., sound output module 155 in FIG. 1).

Figure 4:
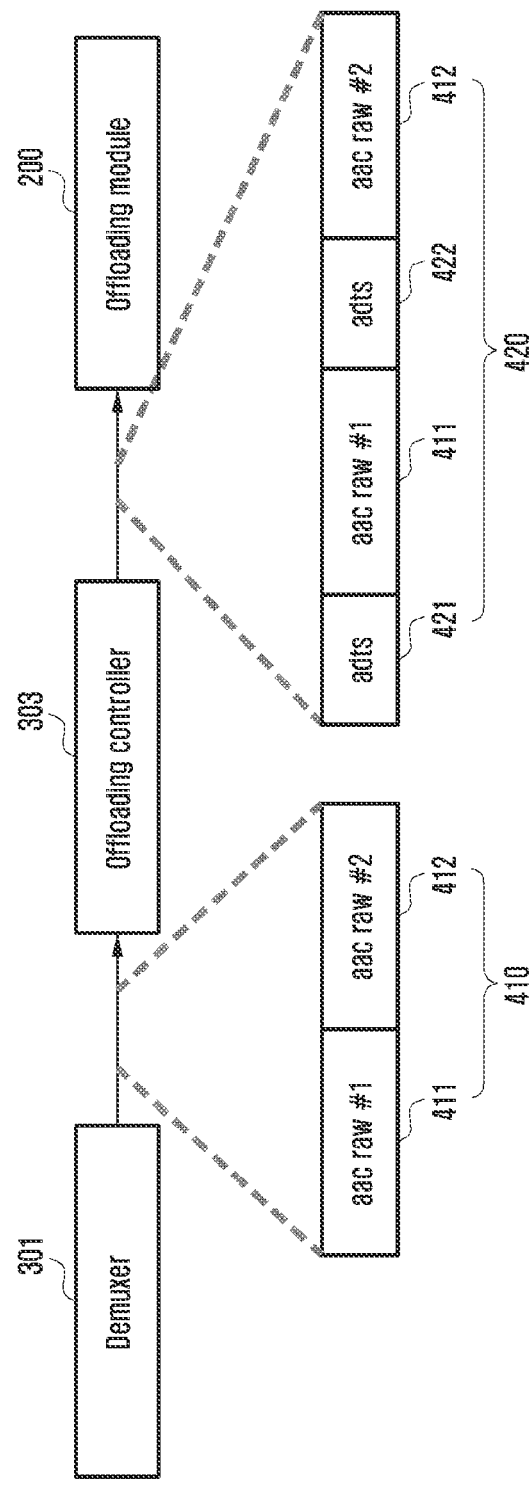
FIG. 4 illustrates an example process of processing frames in an embodiment in which header data is generated to play back audio through offloading.

FIG. 4 illustrates an example process of processing frames in an embodiment in which header data is generated to play back audio through offloading.

With reference to FIG. 4, according to various embodiments, the demuxer 301 (de-multiplexer) may de-multiplex moving image data obtained by the main processor 121 to separate audio data, image data, and timestamps. According to an embodiment, the moving image data may include both audio data and image data, and these data may be multiplexed and transmitted to the demuxer 301. The demuxer 301 may transmit each audio data obtained as a result of demultiplexing to the offloading controller 303.

According to various embodiments, the offloading controller 303 may convert the received first audio data 410. According to an embodiment, the audio data (e.g., first audio data 410) received by the offloading controller 303 from the demuxer 301 may include plural audio frames (e.g., first audio frame 411 and second audio frame 412). According to an embodiment, the offloading controller 303 may add plural header data (e.g., first header data 421, second header data 422) corresponding respectively to the audio frames (e.g., first audio frame 411, second audio frame 412) included in the first audio data 410) to generate second audio data 420 including plural header data (e.g., first header data 421, second header data 422) and plural audio frames (e.g., first audio frame 411, second audio frame 412).

According to various embodiments, the offloading controller 303 may transfer the generated second audio data 420 to the offloading module 200. The header data 421 or 422 may include metadata corresponding to the first audio data 410. According to an embodiment, the offloading controller 303 may generate plural header data (e.g., first header data 421, second header data 422) corresponding respectively to the plural audio frames (e.g., first audio frame 411, second audio frame 412) included in the first audio data 422. The plural header data (e.g., first header data 421, second header data 422) may include metadata respectively for the plural audio frames (e.g., first audio frame 411, second audio frame 412), for example, information on the length and sampling frequency of the audio frame. According to an embodiment, the header data may include data in audio data transport stream (ADTS) format. When the first audio data 410 includes an audio frame encoded in AAC, the offloading controller 303 may generate header data in ADTS format. According to an embodiment, the offloading controller 303 may generate the second audio data 420 by adding the generated header data to the first audio data 410.

FIGS. 5A and 5B illustrate an example process of obtaining a first time using header data in an embodiment in which header data is generated to play back audio through offloading.

Figure 5:
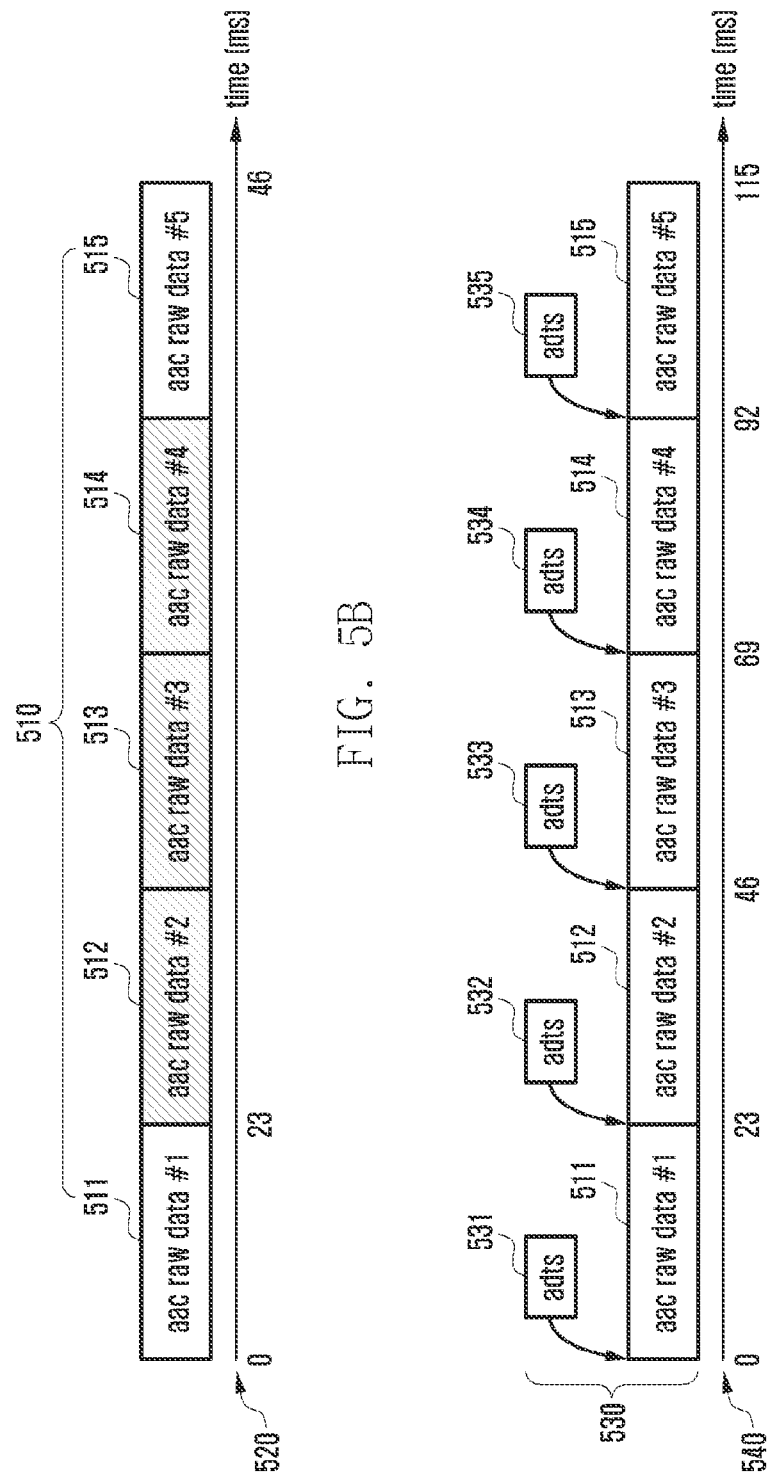
FIGS. 5A and 5B illustrate an example process of obtaining a first time using header data in an embodiment in which header data is generated to play back audio through offloading.

With reference to FIG. 5, although the length of the audio frame, the sampling frequency of the audio frame, and the time jump threshold corresponding thereto may have various values, the description herein is provided based on an assumption that the audio frame size is 1024 bytes and the sampling frequency is 44100 Hz, that is, the playback time per audio frame is 0.023 seconds (23 ms).

FIG. 5A illustrates a case of obtaining first audio data 510, in which some audio frames (e.g., second audio frame 512, third audio frame 513, fourth audio frame 514) are damaged. Here, if audio frames are played back based only on the first audio data 510, the damaged audio frames (e.g., second audio frame 512, third audio frame 513, fourth audio frame 514) may be not played back smoothly, and the offloading module (e.g., offloading module 200 in FIG. 2) may fail to reflect the time required to reproduce the damaged audio frames in the first time. In this case, the abnormal first time information 520 generated by the offloading module 200 may be calculated to be 46 ms by adding up only the playback times of two normal audio frames (e.g., first audio frame 511, fifth audio frame 515), even though the playback is performed over a total of 5 frames (e.g., first audio frame 511, second audio frame 512, third audio frame 513, fourth audio frame 514, and fifth audio frame 515). Then, when the main processor (e.g., main processor 121 in FIG. 2) generates second time information based on the abnormal first time 520 and plays back image frames in response to the second time, the sound and image of the moving image may be not in synchronization.

With reference to FIG. 5B, the second audio data 530 may include a plurality of audio frames (e.g., first audio frame 511, second audio frame 512, third audio frame 513, fourth audio frame 514, fifth audio frame 515), and header data corresponding to each audio frame (e.g., first header data 531, second header data 532, third header data 533, fourth header data 534, and fifth header data 535). According to various embodiments, the main processor 121 may generate the second audio data 530 and transfer the generated second audio data 530 to the offloading module 200. The main processor 121 may generate the second audio data 530 based on the first audio data 510 obtained from the moving image data. The header data may include metadata corresponding to the first audio data. According to an embodiment, the main processor 121 may generate plural header data corresponding respectively to the plural audio frames included in the first audio data. The plural header data may include metadata for the plural audio frames, for example, information on the length and sampling frequency of the audio frame. According to an embodiment, the header data may include data in audio data transport stream (ADTS) format. In case that the first audio data 510 includes an audio frame encoded in AAC, the main processor 121 may generate header data in ADTS format. According to an embodiment, the main processor 121 may generate the second audio data 530 by adding the generated header data to the first audio data 510.

According to various embodiments, the main processor 121 may receive first time information from the offloading module 200. The first time information may be time information generated by the offloading module 200 through decoding plural audio frames included in the second audio data. The first time information may be, for example, time information for the offloading module 200 to play back individual audio frames. According to an embodiment, the first time information may be time information generated by the offloading module 200 based on header data. For example, the offloading module 200 may generate the first time information based on information about the audio frame length included in the header data. Hence, with reference to FIG. 5B, in spite of the damaged audio frames (e.g., second audio frame 512, third audio frame 513, and fourth audio frame 514), the first time information may be generated based on the header data (e.g., first header data 531, second header data 532, third header data 533, fourth header data 534, fifth header data 535) and may be set to 115 ms in correspondence to the five frames (e.g., first audio frame 511, second audio frame 512, third audio frame 513, fourth audio frame 514, fifth audio frame 515).

Figure 6:
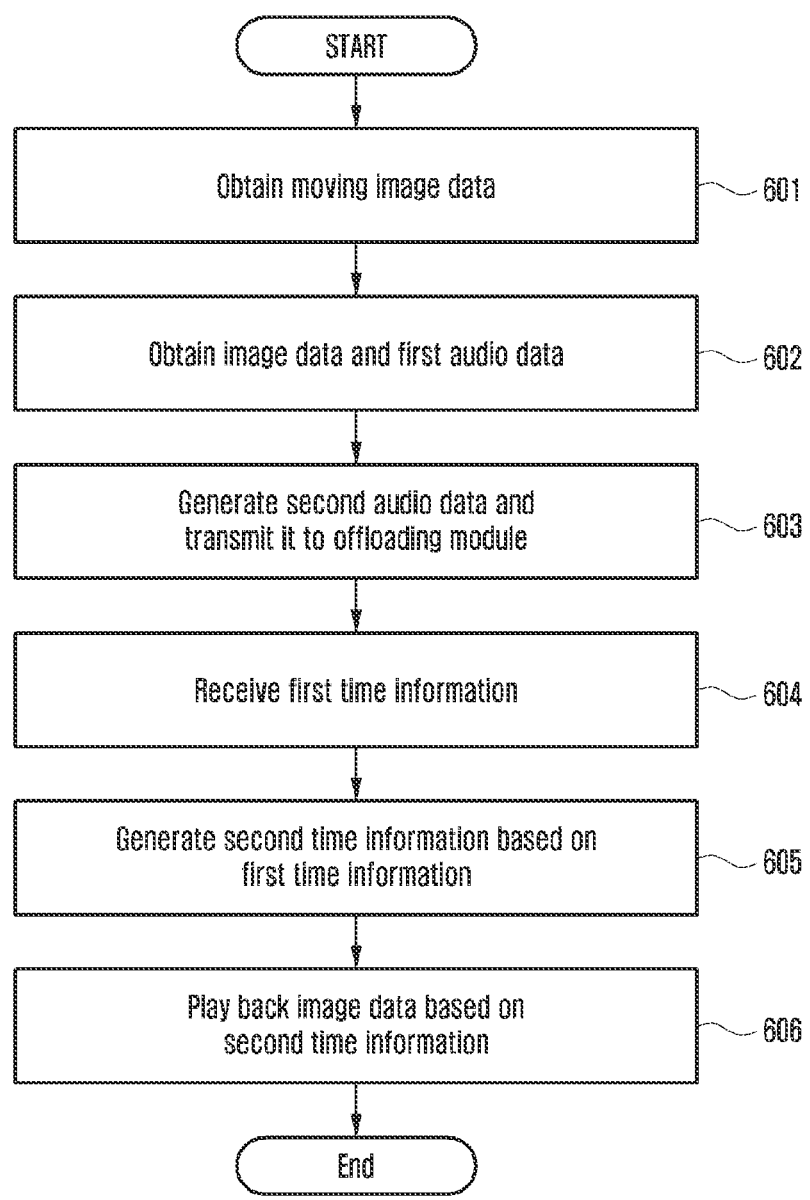
FIG. 6 is a flowchart of example operations of the electronic device to play back moving image data according to various embodiments.

FIG. 6 is a flowchart of example operations of the electronic device to play back moving image data according to various embodiments.

With reference to FIG. 6, a series of operations performed by the electronic device (e.g., electronic device 101 in FIG. 2) to play back moving image data may be described in terms of operations of the main processor (e.g., main processor 121 in FIG. 2) of the electronic device 101. Among the operations of FIG. 6 to be described below, some operation(s) may be omitted or replaced with other operation(s), a new operation(s) may be added, and/or the order of the operations may be changed.

At operation 601, the main processor 121 may obtain moving image data. The moving image data may include one or more pieces of image data and audio data. According to an embodiment, the main processor 121 may receive streaming data from an external electronic device (e.g., electronic device 102 or 104, or server 108 in FIG. 1), and obtain moving image data included in the received streaming data. According to an embodiment, the main processor 121 may obtain moving image data by reading data stored in the memory (e.g., memory 130 in FIG. 1).

At operation 602, the main processor 121 may obtain image data and first audio data. According to an embodiment, the main processor 121 may de-multiplex the obtained moving image data to separate image data, audio data (e.g., first audio data), and timestamps corresponding to the audio data. According to an embodiment, the image data and audio data (e.g., first audio data) obtained through de-multiplexing by the main processor 121 may each be encoded data. According to an embodiment, the image data may include a plurality of encoded image frames. The plural image frames may include consecutive images. According to an embodiment, the first audio data may include a plurality of encoded audio frames. The plural audio frames may include a continuous sound signal. According to an embodiment, the first audio data may include a plurality of consecutive audio frames encoded in advanced audio coding (AAC).

At operation 603, the main processor 121 may generate second audio data and transmit the generated second audio data to the offloading module 200. The main processor 121 may generate the second audio data based on the first audio data obtained from moving image data. The second audio data may be obtained by, for example, adding header data to the first audio data. The header data may include metadata corresponding to the first audio data. According to an embodiment, the main processor 121 may generate a plurality of header data corresponding respectively to plural audio frames included in the first audio data. The plural header data may include metadata for each of the plural audio frames, for example, information on the length and sampling frequency of the audio frame. According to an embodiment, the header data may include data in audio data transport stream (ADTS) format. When the first audio data includes audio frames encoded in AAC, the main processor 121 may generate header data in ADTS format. According to an embodiment, the main processor 121 may generate the second audio data by adding the generated header data to the first audio data. According to an embodiment, the main processor 121 may identify whether the image data is played back simultaneously with the audio signal. Upon identifying that the image data is played back simultaneously with the audio signal, the main processor 121 may generate the second audio data by adding header data.

At operation 604, the main processor 121 may receive first time information from the offloading module 200. The first time information may be time information generated by the offloading module 200 through decoding plural audio frames included in the second audio data. The first time information may be, for example, time information for the offloading module 200 to play back individual audio frames. According to an embodiment, the first time information may be time information generated by the offloading module 200 based on header data. For example, the offloading module 200 may generate the first time information based on information about the audio frame length included in the header data. According to an embodiment, the main processor 121 may continuously and/or periodically receive the first time information from the offloading module 200.

At operation 605, the main processor 121 may generate second time information based on the first time information. The second time information may refer to time information used by the main processor 121 to reproduce image data. The second time information may include, for example, time information obtained by adding the first time information to a preset reference time. The reference time may be a preset and stored value, and the main processor 121 may change the reference time. According to an embodiment, the main processor 121 may generate the second time information by adding the first time information to the reference time.

At operation 606, the main processor 121 may play back image data based on the second time information. According to an embodiment, the main processor 121 may decode plural image frames included in the image data and output them to the outside by using a display module (e.g., display module 160 in FIG. 1). According to an embodiment, the main processor 121 may play back image data based on the second time information so as to play back the plural image frames at the same time with the audio frames corresponding thereto in synchronization.

Figure 7:
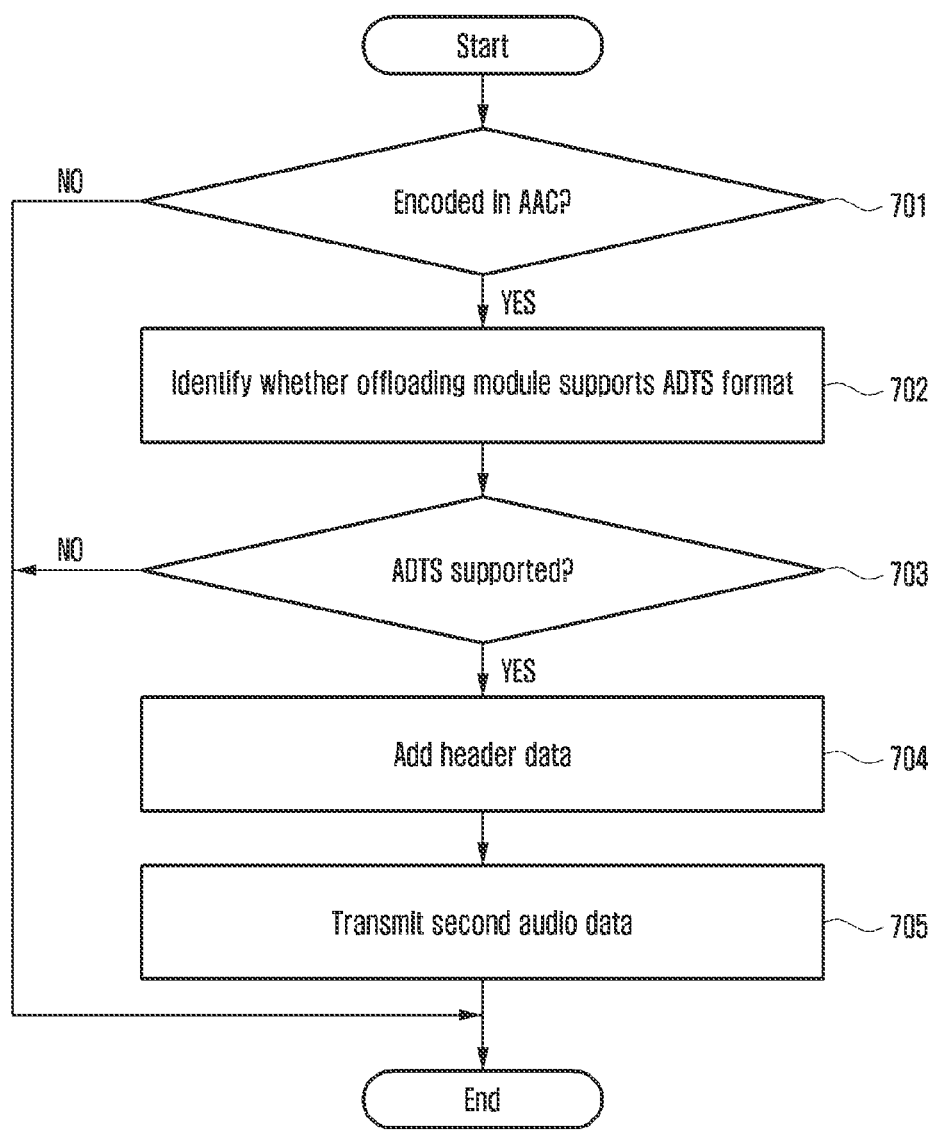
FIG. 7 is a flowchart illustrating example operations of the electronic device to play back moving image data including audio data encoded in AAC according to various embodiments.

FIG. 7 is a flowchart illustrating example operations of the electronic device to play back moving image data including audio data encoded in AAC according to various embodiments.

With reference to FIG. 7, a series of operations performed by the electronic device (e.g., electronic device 101 in FIG. 2) to play back moving image data including audio data encoded in AAC may be described in terms of operations of the main processor (e.g., main processor 121 in FIG. 2) of the electronic device 101. Among operations of FIG. 7 to be described below, some operation(s) may be omitted or replaced with other operation(s), a new operation(s) may be added, and the order of operation(s) may be changed.

At operation 701, the main processor 121 may identify whether the first audio data is data encoded in AAC. The main processor 121 may read encoding information of the obtained first audio data and identify whether an audio frame encoded in AAC is included. For example, the main processor 121 may identify whether the first audio data includes audio frames encoded in AAC based on information obtained by parsing header information.

At operations 702 and 703, the main processor 121 may identify whether the offloading module 200 supports data in ADTS format. For example, the main processor 121 may identify whether the offloading module 200 can read, decode, and reproduce ADTS-formatted data based on an audio playback related signal received from the offloading module 200. As another example, the main processor 121 may identify whether the offloading module 200 supports ADTS-formatted data based on information pre-stored in the memory (e.g., memory 130 in FIG. 1). Based on whether the offloading module 200 supports ADTS-formatted data, the main processor 121 may proceed to operation 704 if ADTS-formatted data is supported, and may end the playback operation if otherwise.

At operation 704, the main data 121 may add header data to the first audio data. The main processor 121 may generate second audio data and transfer the generated second audio data to the offloading module 200. The main processor 121 may generate the second audio data based on the first audio data obtained from the moving image data. The second audio data may be obtained by adding header data to the first audio data. The header data may include metadata corresponding to the first audio data. According to an embodiment, the main processor 121 may generate a plurality of header data corresponding respectively to plural audio frames included in the first audio data. The plural header data may include metadata for each of the plural audio frames, for example, information on the length and sampling frequency of the audio frame. According to an embodiment, the header data may include data in audio data transport stream (ADTS) format. When the first audio data includes audio frames encoded in AAC, the main processor 121 may generate header data in ADTS format. According to an embodiment, the main processor 121 may generate the second audio data by adding the generated header data to the first audio data. According to an embodiment, the main processor 121 may identify whether the image data is played back simultaneously with the audio signal. Upon identifying that the image data is played back simultaneously with the audio signal, the main processor 121 may generate the second audio data by adding header data.

At operation 705, the main processor 121 may transfer the generated second audio data to the offloading module 200.

Figure 8:
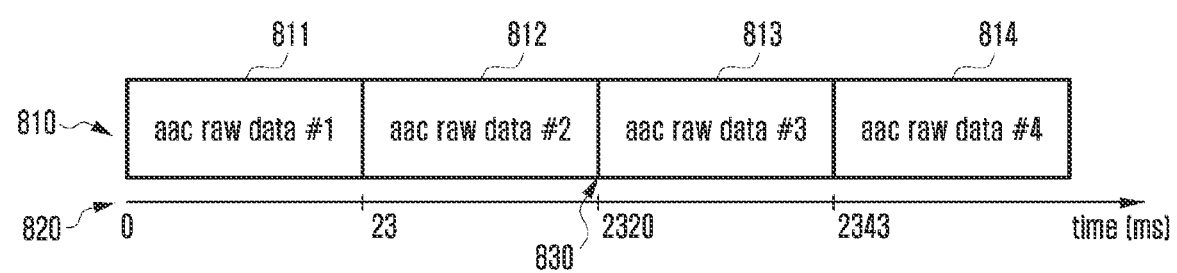
FIG. 8 illustrates an example embodiment in which a time jump has occurred.

FIG. 8 illustrates an example embodiment in which a time jump has occurred.

With reference to FIGS. 5 and 8, although the length of the audio frame, the sampling frequency of the audio frame, and the time jump threshold corresponding thereto may have various values, the description is provided herein for convenience based on an assumption that the audio frame size is 1024 bytes and the sampling frequency is 44100 Hz, that is, the playback time per audio frame is 0.023 seconds (23 ms).

According to various embodiments, a time jump may be understood as an event in which the interval between timestamps corresponding respectively to plural audio frames is not constant. According to an embodiment, the first audio data 810 may include plural consecutive audio frames (e.g., first audio frame 811, second audio frame 812, third audio frame 813, and fourth audio frame 814), and timestamps 820 corresponding respectively to the plural audio frames. The timestamps 820 may include time information corresponding to each of the audio frames (e.g., first audio frame 811, second audio frame 812, third audio frame 813, and fourth audio frame 814). According to an embodiment, the main processor (e.g., main processor 121 in FIG. 2) may identify whether a time jump 830 has occurred by comparing a difference between timestamps corresponding to consecutive audio frames (e.g., second audio frame 812 and third audio frame 813) with a time jump threshold. According to an embodiment, the time jump threshold may be calculated based on the audio frame length and the frame sampling frequency value. For example, the value obtained by dividing the audio frame length by the sampling frequency may be equal to a constant difference value of consecutive timestamps within a margin of error. According to an embodiment, when the audio frame length is not constant, the main processor 121 may set a predetermined value as the time jump threshold. According to an embodiment, the main processor 121 may determine that a time jump 830 has occurred if a difference value between two consecutive timestamps is greater than the time jump threshold. In this document, the description is provided for convenience based on an assumption that the sample size is 1024 bytes and the sampling frequency is 44100 Hz, that is, the time jump threshold is 0.023 seconds (23 ms). With reference to FIG. 8, the time jump threshold may be set to 23 ms. According to an embodiment, the time jump threshold may be larger or smaller than 23 ms within a specific ratio by applying a margin of error within a certain range. In FIG. 8, since the difference between the value of a third timestamp (e.g., 2320 ms) corresponding to the third audio frame 813 and the value of a second timestamp (e.g., 23 ms) corresponding to the second audio frame 812 exceeds the time jump threshold of 23 ms, a time jump event 830 has occurred, and the main processor 121 may detect a time jump.

Figure 9:
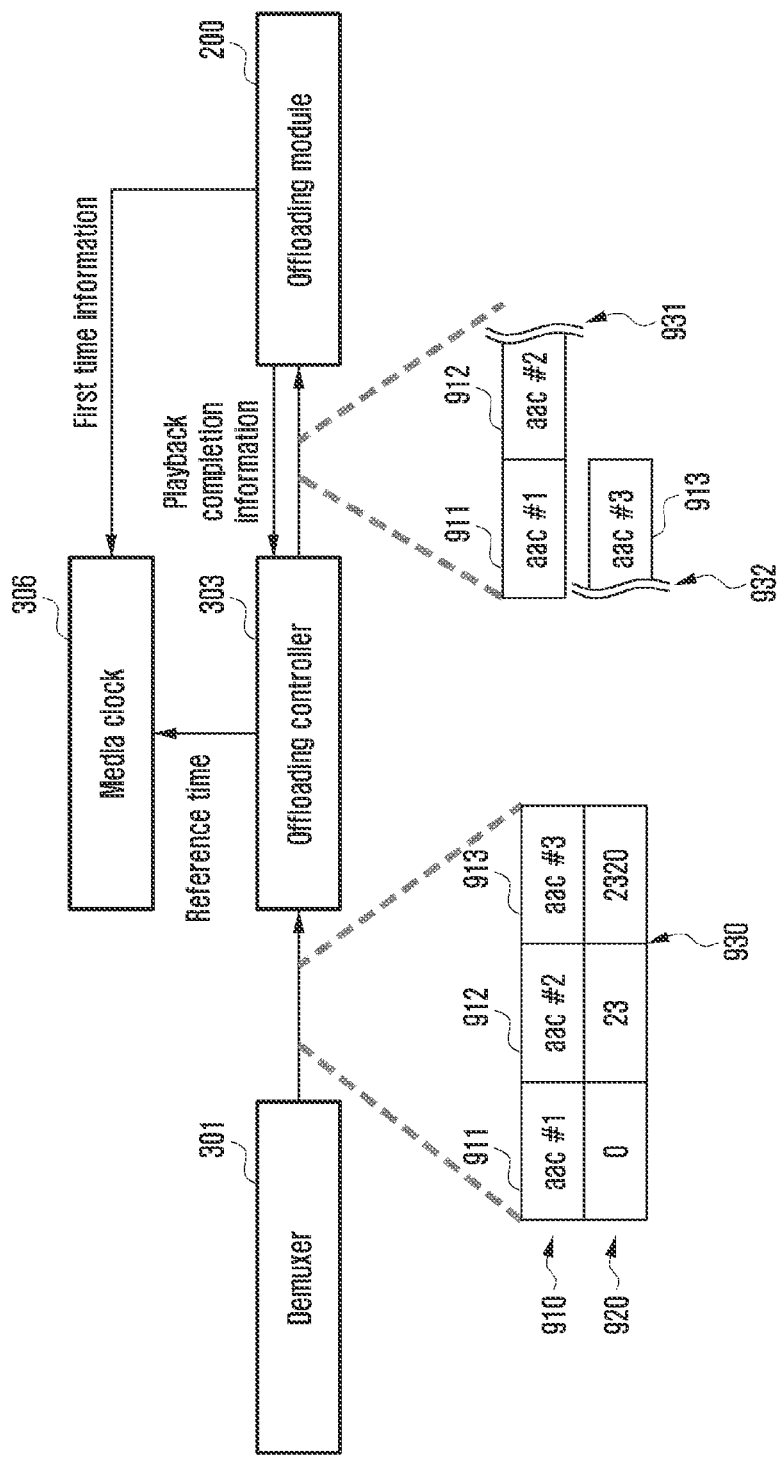
FIG. 9 illustrates an example process of playing back moving image data in an embodiment in which a time jump has occurred.

FIG. 9 illustrates an example process of playing back moving image data in an embodiment in which a time jump has occurred.

With reference to FIG. 9, after receiving, from the demuxer 301, first audio information 910 including plural audio frames (e.g., first audio frame 911, second audio frame 912, and third audio frame 913) and timestamps 920 corresponding respectively to the audio frames included in the first audio information 910, the offloading controller 303 may identify whether a time jump 930 has occurred.

With reference to FIG. 9, the offloading controller 303 may stop audio frame transmission to the offloading module 200 when a time jump has occurred. For example, when a time jump is identified between two consecutive audio frames, that is, the second audio frame 912 and the third audio frame 913, the offloading controller 303 may transmit up to the second audio frame 912 to the offloading module 200 and then stop audio frame transmission without transmitting the third audio frame 913 (931). In this case, the difference between the second timestamp (e.g., 23 ms) and the third timestamp (e.g., 2320 ms) may exceed the time jump threshold (e.g., 23 ms), and the third audio frame 913 corresponding to the third timestamp may be referred to as an "audio frame in which a time jump has occurred".

According to various embodiments, the offloading controller 303 may receive playback completion information from the offloading module 200. According to an embodiment, when all audio frames received from the offloading controller 303 are decoded, the offloading module 200 may generate playback completion information and transmit it to the offloading controller 303. According to an embodiment, along with stopping transmission of the third audio frame 913 (931), the offloading controller 303 may transmit a signal for stopping audio playback to the offloading module 200. The signal for stopping audio playback may include a signal indicating that there is no more audio data to be transmitted to the offloading module 200. The playback completion information sent to the offloading controller 303 may be a signal generated by the offloading module 200 in response to the signal for stopping audio playback (e.g., signal indicating that there is no more audio data to be transmitted).

According to various embodiments, the offloading controller 303 may change the reference time. According to an embodiment, the offloading controller 303 may change the reference time based on a timestamp value (e.g., third timestamp) corresponding to the audio frame in which a time jump has occurred (e.g., third audio frame 913). The reference time may have an initial value set to 0, or may have a value already changed from the initial value. According to an embodiment, the offloading controller 303 may change the reference time based on the third timestamp value (2320). For example, the offloading controller 303 may change the reference time by adding the third timestamp value at which a time jump has occurred to the reference time. In FIG. 9, the offloading controller 303 may change the reference time from an initial value of 0 ms to 2320 ms based on the third timestamp.

According to various embodiments, the offloading controller 303 may resume audio frame transmission. The offloading controller 303 having changed the reference time may transmit audio frames again to the offloading module 200 (932). According to an embodiment, the media clock 306 may update the reference time or change the reference time based on information about a reference time change received from the offloading controller 303. The media clock 306 may generate second time information by adding the first time information received from the offloading module 200 to the changed reference time. The offloading controller 303 may play back image data based on the generated second time information.

Figure 10:
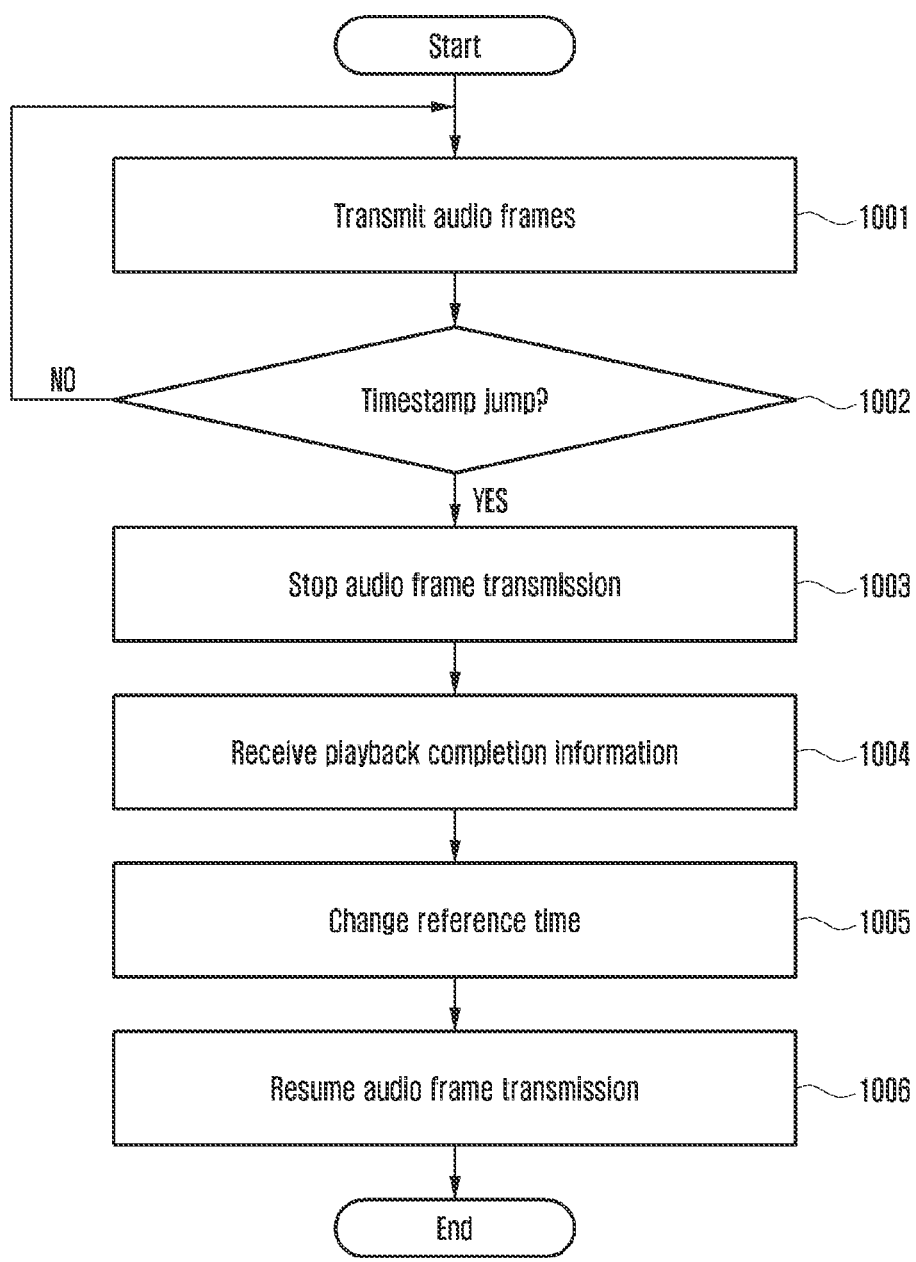
FIG. 10 is a flowchart illustrating example operations of the electronic device to play back moving image data in which a time jump has occurred according to various embodiments.

FIG. 10 is a flowchart illustrating example operations of the electronic device to play back moving image data in which a time jump has occurred according to various embodiments.

With reference to FIG. 10, a series of operations performed by the electronic device (e.g., electronic device 101 in FIG. 2) to play back moving image data in which a time jump has occurred may be described in terms of operations of the main processor (e.g., main processor 121 in FIG. 2) of the electronic device 101. Among operations of FIG. 10 to be described below, some operation(s) may be omitted or replaced with other operation(s), a new operation(s) may be added, and the order of operations may be changed.

At operation 1001, the main processor 121 may transmit audio frames to the offloading module (e.g., offloading module 200 in FIG. 2). According to an embodiment, the audio frames may include plural consecutive frames included in audio data (e.g., first audio data) obtained by demultiplexing moving image data. The plural audio frames may be in an encoded state.

At operation 1002, the main processor 121 may identify whether a time jump has occurred. A time jump may be understood as, for example, an event in which the interval between timestamps corresponding respectively to plural audio frames is not constant. According to an embodiment, the first audio data may include plural consecutive audio frames, and the timestamp may include a plurality of data corresponding respectively to the plural audio frames. The timestamp may include time information corresponding to each audio frame. According to an embodiment, the main processor 121 may identify whether a time jump has occurred by comparing a difference between timestamps (e.g., first timestamp and second timestamp) corresponding to consecutive audio frames (e.g., first audio frame and second audio frame) with a time jump threshold. According to an embodiment, the time jump threshold may be calculated based on the audio frame length and the frame sampling frequency value. For example, the value obtained by dividing the audio frame length by the sampling frequency may be equal to a constant difference value of consecutive timestamps within a margin of error. According to an embodiment, when the audio frame length is not constant, the main processor 121 may set a predetermined value as the time jump threshold. According to an embodiment, the main processor 121 may determine that a time jump has occurred if a difference value between two consecutive timestamps is greater than the time jump threshold. Although the length of the audio frame, the sampling frequency of the audio frame, and the time jump threshold corresponding thereto may have various values, the description herein is provided based on an assumption that the sample size is 1024 bytes and the sampling frequency is 44100 Hz, that is, the time jump threshold is 0.023 seconds (23 ms). If a time jump occurs, the process proceeds to operation 1003. If no time jump occurs, the process returns to operation 1001.

At operation 1003, the main processor 121 may stop transmitting audio frames to the offloading module 200. For example, when a time jump is identified between two consecutive audio frames, that is, a first audio frame and a second audio frame, the main processor 121 may transmit up to the first audio frame to the offloading module 200 and then stop transmission of the second audio frame. This may be a case in which the difference value between the first timestamp and the second timestamp exceeds the time jump threshold, and the second audio frame corresponding to the second timestamp may be referred to as an "audio frame in which a time jump has occurred".

At operation 1004, the main processor 121 may receive playback completion information from the offloading module 200. According to an embodiment, when all audio frames received from the main processor 121 are decoded, the offloading module 200 may generate playback completion information and transmit the playback completion information to the main processor 121. According to an embodiment, after stopping transmission of the second audio frame, the main processor 121 may transmit a signal for stopping audio playback to the offloading module 200. The signal for stopping audio playback may include a signal indicating that there is no more audio data to be transmitted to the offloading module 200. The playback completion information may be a signal generated by the offloading module 200 in response to the signal for stopping audio playback (e.g., signal indicating that there is no more audio data to be transmitted).

At operation 1005, the main processor 121 may change the reference time. According to an embodiment, the main processor 121 may change the reference time based on a timestamp value (e.g., second timestamp) corresponding to the audio frame in which a time jump has occurred. The reference time may have an initial value set to 0, or may have a value already changed from the initial value. According to an embodiment, the main processor 121 may change the reference time based on the second timestamp value. For example, the main processor 121 may change the reference time by adding a second timestamp value at which a time jump has occurred to the reference time.

At operation 1006, the main processor 121 may resume audio frame transmission. The main processor 121 having changed the reference time may transmit audio frames again to the offloading module 200. According to an embodiment, the main processor 121 may generate second time information by adding the first time information, which is generated and transmitted by the offloading module 200 based on received audio frames, to the changed reference time. The main processor 121 may play back image data based on the generated second time information.

Figure 11:
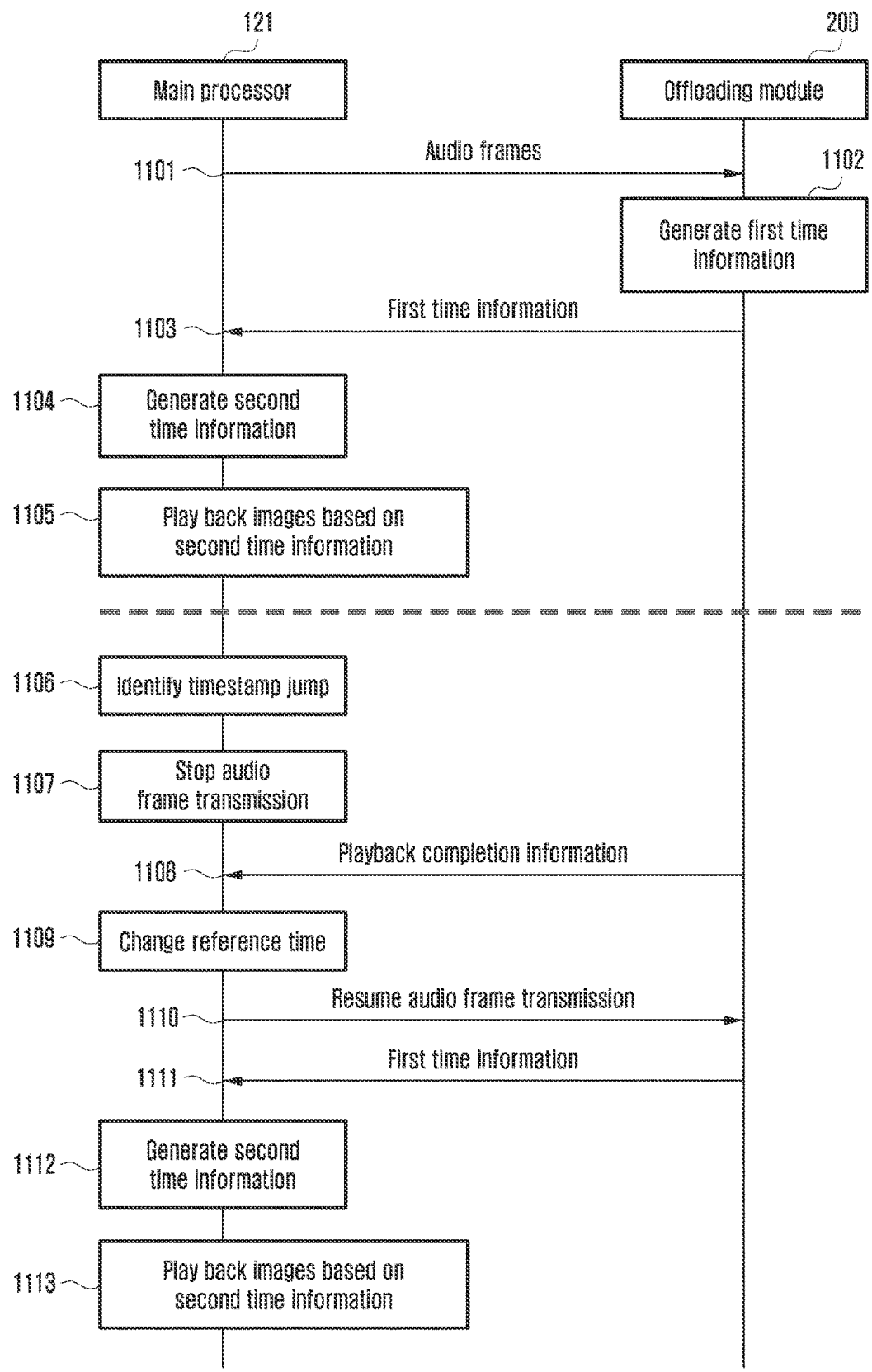
FIG. 11 is a signal transfer diagram for an example in which an electronic device plays back moving image data in which a time jump has occurred according to various embodiments.

FIG. 11 is a signal transfer diagram for a case in which an example electronic device plays back moving image data in which a time jump has occurred according to various embodiments.

At operation 1101, the main processor 121 may transmit audio frames to the offloading module (e.g., offloading module 200 in FIG. 2). According to an embodiment, the audio frames may include plural consecutive frames included in audio data (e.g., first audio data) obtained by demultiplexing moving image data. The plural audio frames may be in an encoded state.

At operation 1102, the offloading module 200 may generate first time information. The first time information may be time information generated by the offloading module 200 by decoding plural audio frames included in the second audio data. The first time information may be, for example, time information for the offloading module 200 to play back individual audio frames. According to an embodiment, the first time information may be time information generated by the offloading module 200 based on header data. For example, the offloading module 200 may generate the first time information based on information about the audio frame length included in the header data.

At operation 1103, according to an embodiment, the main processor 121 may receive the first time information from the offloading module 200. The offloading module 200 may transmit the first time information to the main processor 121.

At operation 1104, the main processor 121 may generate second time information based on the first time information, and play back image data based on the generated second time information. The second time information may include, for example, time information obtained by adding the first time information to a preset reference time. The reference time may be a preset and stored value, and the main processor 121 may change the reference time.

At operation 1105, the main processor 121 may play back image data based on the second time information. According to an embodiment, the main processor 121 may decode plural image frames included in the image data and output them to the outside by using a display module (e.g., display module 160 in FIG. 1, output module 210 in FIG. 2). According to an embodiment, the main processor 121 may play back image data based on the second time information so as to play back the plural image frames at the same time with the audio frames corresponding thereto in synchronization.

At operation 1106, according to an embodiment, the main processor 121 may identify whether a time jump has occurred. A time jump may be understood as, for example, an event in which the interval between timestamps corresponding respectively to plural audio frames is not constant. According to an embodiment, the first audio data may include plural consecutive audio frames, and the timestamp may include a plurality of data corresponding respectively to the plural audio frames. The timestamp may include time information corresponding to each audio frame. According to an embodiment, the main processor 121 may identify whether a time jump has occurred by comparing a difference between timestamps (e.g., first timestamp and second timestamp) corresponding to consecutive audio frames (e.g., first audio frame and second audio frame) with a time jump threshold. According to an embodiment, the time jump threshold may be calculated based on the audio frame length and the frame sampling frequency value. For example, the value obtained by dividing the audio frame length by the sampling frequency may be equal to a constant difference value of consecutive timestamps within a margin of error. According to an embodiment, when the audio frame length is not constant, the main processor 121 may set a predetermined value as the time jump threshold. According to an embodiment, the main processor 121 may determine that a time jump has occurred if a difference value between two consecutive timestamps is greater than the time jump threshold. Although the length of the audio frame, the sampling frequency of the audio frame, and the time jump threshold corresponding thereto may have various values, the description herein is provided based on the assumption that the sample size is 1024 bytes and the sampling frequency is 44100 Hz, that is, the time jump threshold is 0.023 seconds (23 ms).

At operation 1107, the main processor 121 may stop transmitting audio frames to the offloading module 200 when a time jump has occurred. For example, when a time jump is identified between two consecutive audio frames, that is, a first audio frame and a second audio frame, the main processor 121 may transmit up to the first audio frame to the offloading module 200 and then stop transmission of the second audio frame. This may be a case in which the difference value between the first timestamp and the second timestamp exceeds the time jump threshold, and the second audio frame corresponding to the second timestamp may be referred to as an "audio frame in which a time jump has occurred".

At operation 1108, the main processor 121 may receive playback completion information from the offloading module 200. According to an embodiment, when all audio frames received from the main processor 121 are decoded, the offloading module 200 may generate playback completion information and transmit the playback completion information to the main processor 121. According to an embodiment, after stopping transmission of the second audio frame, the main processor 121 may transmit a signal for stopping audio playback to the offloading module 200 (not shown in FIG. 11). The signal for stopping audio playback may include a signal indicating that there is no more audio data to be transmitted to the offloading module 200. The playback completion information may be a signal generated by the offloading module 200 in response to the signal for stopping audio playback (e.g., signal indicating that there is no more audio data to be transmitted).

At operation 1109, the main processor 121 may change the reference time. According to an embodiment, the main processor 121 may change the reference time based on a timestamp value (e.g., second timestamp) corresponding to the audio frame in which a time jump has occurred. The reference time may have an initial value set to 0, or may have a value already changed from the initial value. According to an embodiment, the main processor 121 may change the reference time based on the second timestamp value. For example, the main processor 121 may change the reference time by adding a second timestamp value at which a time jump has occurred to the reference time.

At operation 1110, the main processor 121 may resume audio frame transmission. The main processor 121 having changed the reference time may transmit audio frames again to the offloading module 200.

Referring to operations 1111, 1112 and 1113, the main processor 121 may receive the first time information again from the offloading module 200 (1111), generate second time information by adding the received first time information to the changed reference time information (1112), and play back images based on the second time information (1113). According to an embodiment, the main processor 121 may generate the second time information by adding the first time information, which is generated and transmitted by the offloading module 200 based on received audio frames, to the changed reference time. The main processor 121 may play back image data based on the generated second time information.

Figure 12:
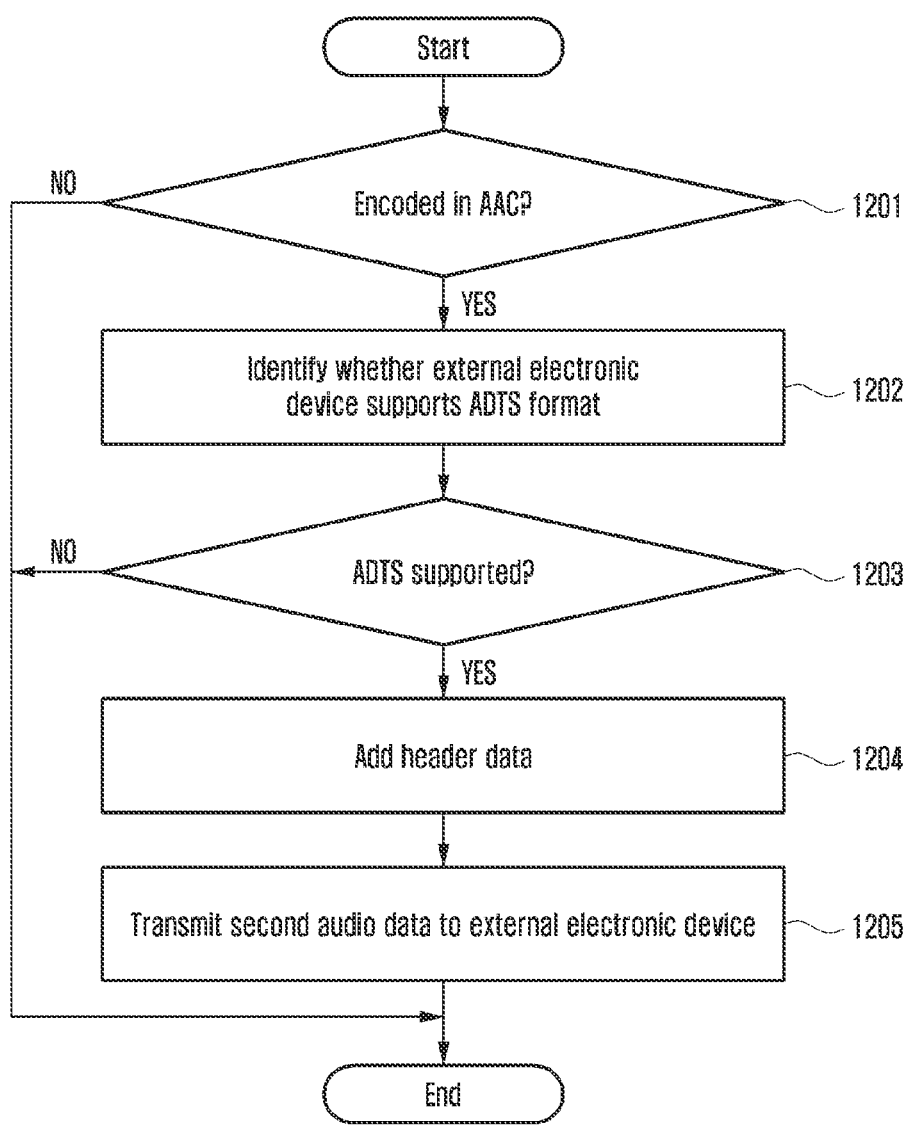
FIG. 12 is a flowchart of example operations of the electronic device to perform offloaded playback using an external electronic device according to various embodiments.

FIG. 12 is a flowchart of example operations of the electronic device to perform offloaded playback using an external electronic device according to various embodiments.

With reference to FIG. 12, a series of operations performed by the electronic device (e.g., electronic device 101 in FIG. 2) to perform offloaded playback using an external electronic device may be described in terms of operations of the main processor (e.g., main processor 121 in FIG. 2) of the electronic device 101. Among operations of FIG. 12 to be described below, some operation(s) may be omitted or replaced with other operation(s), a new operation(s) may be added, and the order of operation(s) may be changed.

At operation 1201, the main processor 121 may identify whether the first audio data is data encoded in AAC. The main processor 121 may read encoding information of the obtained first audio data and identify whether an audio frame encoded in AAC is included. For example, the main processor 121 may identify whether the first audio data includes audio frames encoded in AAC based on information obtained by parsing header information. If the first audio data is not data encoded in AAC, the operations end. If the first audio data is data encoded in AAC, the process proceeds to operation 1202.

At operations 1202 and 1203, the main processor 121 may identify whether the external electronic device 102 supports data in ADTS format. For example, the main processor 121 may identify whether the external electronic device 102 can read, decode, and reproduce ADTS-formatted data based on an audio playback related signal received from the external electronic device 102. As another example, the main processor 121 may identify whether the external electronic device 102 supports ADTS-formatted data based on information pre-stored in the memory (e.g., memory 130 in FIG. 1). Based on whether the external electronic device 102 supports ADTS-formatted data, the main processor 121 may proceed to operation 1204 if ADTS-formatted data is supported, and may end the playback operation if otherwise.

At operation 1204, the main data 121 may add header data to the first audio data. The main processor 121 may generate second audio data and transmit the generated second audio data to the external electronic device 102. The main processor 121 may generate the second audio data based on the first audio data obtained from the moving image data. The second audio data may be obtained by adding header data to the first audio data. The header data may include metadata corresponding to the first audio data. According to an embodiment, the main processor 121 may generate a plurality of header data corresponding respectively to plural audio frames included in the first audio data. The plural header data may include metadata for each of the plural audio frames, for example, information on the length and sampling frequency of the audio frame. According to an embodiment, the header data may include data in audio data transport stream (ADTS) format. When the first audio data includes audio frames encoded in AAC, the main processor 121 may generate header data in ADTS format. According to an embodiment, the main processor 121 may generate the second audio data by adding the generated header data to the first audio data. According to an embodiment, the main processor 121 may identify whether the image data is played back simultaneously with the audio signal. Upon identifying that the image data is played back simultaneously with the audio signal, the main processor 121 may generate the second audio data by adding header data.

At operation 1205, the main processor 121 may transmit the generated second audio data to the external electronic device 102. According to an embodiment, the main processor 121 may transmit the second audio data to the external electronic device 102 by using the communication module (e.g., communication module 190 in FIG. 1).

An electronic device according to various embodiments of this document may include: at least one auxiliary processor; and a main processor operably connected to the at least one auxiliary processor, wherein the main processor may be configured to: obtain moving image data; separate the moving image data into image data including plural consecutive image frames, first audio data including plural consecutive audio frames, and plural timestamps corresponding respectively to the plural consecutive audio frames; generate second audio data using the first audio data by adding header data to each of the plural audio frames; transmit the second audio data to the at least one auxiliary processor; generate, based on first time information successively received from the at least one auxiliary processor, second time information; and play back the image data based on the second time information, and wherein the at least one auxiliary processor may be configured to: play back an audio signal based on the received second audio data; and generate the first time information about a playback time of the audio signal based on the header data.

Further, the plural audio frames may be encoded in advanced audio coding (AAC).

Further, the header data may include data in audio data transport stream (ADTS) format.

Further, the header data may include at least information about the data length of a corresponding audio frame.

Further, based on the first audio data including audio frames encoded in AAC, the main processor may be configured to: identify whether the image data is played back simultaneously with the audio signal; identify whether the at least one auxiliary processor supports data in ADTS format; and generate the second audio data by adding the header data to the first audio data based on identifying that the image data is played back simultaneously with the audio signal and based on identifying that the at least one auxiliary processor supports ADTS-formatted data.

Further, the main processor may be configured to: identify whether a time jump has occurred based on a comparison between a first timestamp corresponding to a first audio frame among the plural timestamps and a second timestamp corresponding to a second audio frame immediately following the first audio frame; and change the second time information based on the second timestamp when a time jump has occurred.

Further, the main processor may be configured to: calculate a difference value between the second timestamp and the first timestamp; and determine that a time jump has occurred when the difference value is greater than a time jump threshold.

Further, the main processor may be configured to calculate the time jump threshold based on sizes and sampling frequencies of the plural audio frames.

Further, when a time jump has occurred, the main processor may be configured to: stop transmission of the second audio frame after transmitting the first audio frame to the at least one auxiliary processor; receive playback completion information from the at least one auxiliary processor; change the second time information based on the second timestamp; and resume transmission of the second audio frame to the at least one auxiliary processor.

Further, the main processor may be configured to: receive the first time information successively from the at least one auxiliary processor; obtain the second time information by adding the received first time information in sequence to the reference time; and change the reference time based on the value of the second timestamp when a time jump has occurred.

A method for an electronic device including at least one auxiliary processor to play back moving image data according to various embodiments disclosed in this document may include: separating the moving image data into image data including plural consecutive image frames, first audio data including plural consecutive audio frames, and plural timestamps corresponding respectively to the plural consecutive audio frames; generating second audio data using the first audio data by adding header data to each of the plural audio frames; transmitting the second audio data to the at least one auxiliary processor; generating, based on first time information successively received from the at least one auxiliary processor, second time information; and playing back the image data based on the second time information.

Further, the plural audio frames may be encoded in advanced audio coding (AAC).

Further, the header data may include data in audio data transport stream (ADTS) format.

Further, the header data may include at least information about the data length of a corresponding audio frame.

Further, based on the first audio data including audio frames encoded in AAC, the method may further include: identifying whether the image data is played back simultaneously with the audio signal; identifying whether the at least one auxiliary processor supports data in ADTS format; and generating the second audio data by adding the header data to the first audio data based on identifying that the image data is played back simultaneously with the audio signal and based on identifying that the at least one auxiliary processor supports ADTS-formatted data.

Further, the method may include: identifying whether a time jump has occurred based on a comparison between a first timestamp corresponding to a first audio frame among the plural timestamps and a second timestamp corresponding to a second audio frame immediately following the first audio frame; and changing the second time information based on the second timestamp based on identifying that a time jump has occurred.

Further, the method may include: calculating a difference value between the second timestamp and the first timestamp; and determining that a time jump has occurred based on the difference value being greater than a time jump threshold.

Further, based on identifying that a time jump has occurred, the method may include: stopping transmission of the second audio frame after transmitting the first audio frame to the at least one auxiliary processor; receiving playback completion information from the at least one auxiliary processor; changing the second time information based on the second timestamp; and resuming transmission of the second audio frame to the at least one auxiliary processor.

Further, the method may include: receiving the first time information successively from the at least one auxiliary processor; obtaining the second time information by adding the received first time information in sequence to the reference time; and changing the reference time based on the value of the second timestamp based on identifying that a time jump has occurred.

An electronic device according to various embodiments disclosed in this document may include: a communication module communicatively connected to an external electronic device; and a processor operably connected to the communication module, wherein, when playing back moving image data, the processor may be configured to: separate the moving image data into image data including plural consecutive image frames and first audio data including plural consecutive audio frames; identify, when the first audio data includes audio frames encoded in AAC, whether the external electronic device supports ADTS-formatted data; generate second audio data by adding header data to each of the plural audio frames based on identifying that the external electronic device supports ADTS-formatted data; transmit the second audio data to the external electronic device; generate, based on first time information received from the external electronic device, second time information; and play back the image data based on the second time information.

The electronic devices according to various embodiments disclosed in this document may be devices of various types. The electronic devices may include, for example, a portable communication device (e.g., smartphone), a computer device, a portable multimedia device, a portable medical device, a camera, a wearable device, a home appliance or the like. The electronic devices according to embodiments of this document are not limited to the above-described devices.

Various embodiments of this document and terms used therein are not intended to limit the technical features described in this document to specific embodiments, and should be understood as including various modifications, equivalents, or substitutes of a corresponding embodiment. With regard to the description of the drawings, similar reference numerals may be used to refer to similar or related elements. A singular form of a noun corresponding to a specific item may include one or multiple pieces of the item unless the relevant context clearly indicates otherwise. In this document, each of phrases such as "A or B", "at least one of A and B", "at least one of A or B", "A, B or C", "at least one of A, B and C", and "at least one of A, B or C" may include any one of or all possible combinations of the items enumerated together in the corresponding one of the phrases. Terms such as "1st" and "2nd", or "first" and "second" may be used to simply distinguish a corresponding component from another, and does not limit the components in other aspect (e.g., importance or order). When an element (e.g., first element) is referred to, with or without the term "operably" or "communicatively", as "coupled to/with" or "connected to/with" another element (e.g., second element), the element may be connected or coupled to the other element directly (e.g., wiredly), wirelessly, or via a third element.

The term "module" used in various embodiments of this document may include a unit implemented in hardware, software, or firmware, or any combination thereof, and may be used interchangeably with other terms, for example, "logic", "logic block", "component", or "circuit". A module may be a single integral component, or a minimum unit or part thereof performing one or more functions. For example, according to an embodiment, a module may be implemented in a form of an application-specific integrated circuit (ASIC).

Various embodiments of this document may be implemented as software (e.g., programs 140) including one or more instructions that are stored in a storage medium (e.g., internal memory 136 or external memory 138) readable by a machine (e.g., electronic device 101). For example, a processor (e.g., processor 120) of the machine (e.g., electronic device 101) may invoke at least one of the one or more instructions stored in the storage medium to execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Wherein the "non-transitory storage medium is a tangible device and may not include a signal (e.g., electromagnetic wave), but this term does not distinguish whether data is stored semi-permanently or temporarily in the storage medium.

According to an embodiment, a method according to various embodiments disclosed in this document may be provided by being included in a computer program product. The computer program product may be traded as a commodity between a seller and a purchaser. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For online distribution, at least a portion of the computer program product may be temporarily stored or temporarily created in a machine readable storage medium such as a memory of a manufacturer's server, an application store's server, or a relay server.

According to various embodiments, each component (e.g., module or program) of the above-described components may include a single entity or multiple entities, and some of the multiple entities may be separately arranged on other components. According to various embodiments, one or more components or operations may be omitted from the above-described components, or one or more other components or operations may be added. Alternatively or additionally, a plurality of components (e.g., modules or programs) may be integrated into a single component. In this case, the integrated component may perform one or more functions of each of the plurality of components in the same or similar manner as they are performed by a corresponding one of the plurality of components before the integration. According to various embodiments, operations performed by a module, a program, or another component may be carried out in sequence, in parallel, by repetition, or heuristically, or one or more of the operations may be executed in a different order or may be omitted, and one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
at least one auxiliary processor; and
a main processor operably connected to the at least one auxiliary processor,
wherein the main processor is configured to:
obtain moving image data;
separate the moving image data into image data including plural consecutive image frames, first audio data including plural consecutive audio frames, and plural timestamps corresponding respectively to the plural consecutive audio frames;
generate second audio data using the first audio data by adding header data to each of the plural audio frames;
transmit the second audio data to the at least one auxiliary processor;
generate, based on first time information successively received from the at least one auxiliary processor, second time information; and
play back the image data based on the second time information,
wherein the at least one auxiliary processor is configured to:
play back an audio signal based on the received second audio data; and
generate the first time information about a playback time of the audio signal based on the header data,
wherein the main processor is further configured to:
calculate a difference value between a first timestamp corresponding to a first audio frame and a second timestamp corresponding to a second audio frame immediately following the first audio frame among the plural timestamps;
identify that a time jump has occurred based on the difference value being greater than a time jump threshold; and
change the second time information based on the second timestamp based on identifying that the time jump has occurred.

2. The electronic device of claim 1, wherein the plural audio frames are encoded in advanced audio coding (AAC).

3. The electronic device of claim 2, wherein the header data includes data in audio data transport stream (ADTS) format.

4. The electronic device of claim 1, wherein the header data includes at least information about a data length of a corresponding audio frame.

5. The electronic device of claim 1, wherein, based on the first audio data including audio frames encoded in AAC, the main processor is configured to:
identify whether the image data is played back simultaneously with the audio signal;
identify whether the at least one auxiliary processor supports data in ADTS format; and
generate the second audio data by adding the header data to the first audio data based on the image data being played back simultaneously with the audio signal and the at least one auxiliary processor supporting ADTS-formatted data.

6. The electronic device of claim 1, wherein the main processor is configured to calculate the time jump threshold based on sizes and sampling frequencies of the plural audio frames.

7. The electronic device of claim 1, wherein, based on identifying that a time jump has occurred, the main processor is configured to:
stop transmission of the second audio frame after transmitting the first audio frame to the at least one auxiliary processor;
receive playback completion information from the at least one auxiliary processor;
change the second time information based on the second timestamp; and
resume transmission of the second audio frame to the at least one auxiliary processor.

8. The electronic device of claim 1, wherein the main processor is configured to:
receive the first time information successively from the at least one auxiliary processor;
obtain the second time information by adding the received first time information in sequence to a reference time; and change the reference time based on a value of the second timestamp based on identifying that a time jump has occurred.

9. A method for an electronic device including at least one auxiliary processor to play back moving image data, the method comprising:
    separating the moving image data into image data including plural consecutive image frames, first audio data including plural consecutive audio frames, and plural timestamps corresponding respectively to the plural consecutive audio frames;
    generating second audio data using the first audio data by adding header data to each of the plural audio frames;
    transmitting the second audio data to the at least one auxiliary processor;
    generating, based on first time information successively received from the at least one auxiliary processor, second time information; and
    playing back the image data based on the second time information,
    wherein the method further comprises:
        calculating a difference value between a first timestamp corresponding to a first audio frame and a second timestamp corresponding to a second audio frame immediately following the first audio frame among the plural timestamps;
        identifying that a time jump has occurred based on the difference value being greater than a time jump threshold; and
        changing the second time information based on the second timestamp based on identifying that the time jump has occurred.

10. The method of claim 9, wherein the plural audio frames are encoded in advanced audio coding (AAC).

11. The method of claim 10, wherein the header data includes data in audio data transport stream (ADTS) format.

12. The method of claim 9, wherein the header data includes at least information about a data length of a corresponding audio frame.

13. The method of claim 9, further comprising, based on the first audio data including audio frames encoded in AAC:
    identifying whether the image data is played back simultaneously with the audio signal;
    identifying whether the at least one auxiliary processor supports data in ADTS format; and
    generating the second audio data by adding the header data to the first audio data based on identifying that the image data is played back simultaneously with the audio signal and identifying that the at least one auxiliary processor supports ADTS-formatted data.

14. The method of claim 9, further comprising, based on identifying that a time jump has occurred:
    stopping transmission of the second audio frame after transmitting the first audio frame to the at least one auxiliary processor;
    receiving playback completion information from the at least one auxiliary processor;
    changing the second time information based on the second timestamp; and
    resuming transmission of the second audio frame to the at least one auxiliary processor.

15. The method of claim 9, comprising:
    receiving the first time information successively from the at least one auxiliary processor;
    obtaining the second time information by adding the received first time information in sequence to a reference time; and
    changing the reference time based on a value of the second timestamp based on identifying that a time jump has occurred.

16. An electronic device comprising:
    a communication module communicatively connected to an external electronic device; and
    a processor operably connected to the communication module,
    wherein, based on playing back moving image data, the processor is configured to:
        separate the moving image data into image data including plural consecutive image frames and first audio data including plural consecutive audio frames;
        identify, based on the first audio data including audio frames encoded in AAC, whether the external electronic device supports ADTS-formatted data;
        generate second audio data by adding header data to each of the plural audio frames based on identifying that the external electronic device supports ADTS-formatted data;
        transmit the second audio data to the external electronic device;
        generate, based on first time information received from the external electronic device, second time information; and
        play back the image data based on the second time information,
    wherein the processor is further configured to:
        calculate a difference value between a first timestamp corresponding to a first audio frame and a second timestamp corresponding to a second audio frame immediately following the first audio frame among the plural timestamps;
        identify that a time jump has occurred based on the difference value being greater than a time jump threshold; and
        change the second time information based on the second timestamp based on identifying that the time jump has occurred.

* * * * *